US009392153B2

(12) United States Patent
Myhre et al.

(10) Patent No.: US 9,392,153 B2
(45) Date of Patent: Jul. 12, 2016

(54) PLENOPTIC CAMERA RESOLUTION

(71) Applicant: Lytro, Inc., Mountain View, CA (US)

(72) Inventors: Graham Butler Myhre, San Francisco, CA (US); Chia-Kai Liang, San Jose, CA (US); Colvin Pitts, Snohomish, WA (US); Carl (Warren) Craddock, San Francisco, CA (US); Yi-Ren Ng, Palo Alto, CA (US)

(73) Assignee: Lytro, Inc., Mountain View, CA (US)

( * ) Notice: Subject to any disclaimer, the term of this patent is extended or adjusted under 35 U.S.C. 154(b) by 86 days.

(21) Appl. No.: 14/573,651

(22) Filed: Dec. 17, 2014

(65) Prior Publication Data

US 2015/0181091 A1    Jun. 25, 2015

Related U.S. Application Data

(60) Provisional application No. 61/920,709, filed on Dec. 24, 2013, provisional application No. 61/920,710, filed on Dec. 24, 2013.

(51) Int. Cl.
*H04N 5/225* (2006.01)
*G02B 13/16* (2006.01)
*H04N 17/00* (2006.01)
*H04N 5/357* (2011.01)
(Continued)

(52) U.S. Cl.
CPC .......... *H04N 5/2254* (2013.01); *G02B 27/0075* (2013.01); *H04N 5/3572* (2013.01); *H04N 17/002* (2013.01)

(58) Field of Classification Search
CPC ... H04N 5/2259; H04N 5/2254; H04N 5/217; H04N 9/045; G03B 5/00; G06K 9/209

USPC .......... 348/335–340; 359/618, 619, 558, 853; 382/254, 275
See application file for complete search history.

(56) References Cited

U.S. PATENT DOCUMENTS

| 6,466,207 | B1 | 10/2002 | Gortler et al. |
| 7,620,309 | B2 | 11/2009 | Georgiev |
| 7,623,726 | B1 | 11/2009 | Georgiev |

(Continued)

OTHER PUBLICATIONS

Cohen, Noy, et al., "Enhancing the performance of the light field microscope using wavefront coding", Optics Express, vol. 22, Issue 20 (2014).

(Continued)

*Primary Examiner* — Kelly L Jerabek
(74) *Attorney, Agent, or Firm* — Raubvogel Law Office

(57) ABSTRACT

According to various embodiments, the system and method disclosed herein facilitate the design of plenoptic camera lens systems to enhance camera resolution. A first configuration for the plenoptic camera may first be selected, with a first plurality of variables that define attributes of the plenoptic camera. The attributes may include a main lens attribute of a main lens of the plenoptic camera and/or a phase mask attribute of a phase mask of the plenoptic camera. A merit function may be applied by simulating receipt of light through the main lens and the plurality of microlenses of the first configuration to calculate a first merit function value. The main lens attribute and/or the phase mask attribute may be iteratively perturbed, and the merit function may be re-applied. An optimal set of variables may be identified by comparing results of successive applications of the merit function.

31 Claims, 19 Drawing Sheets

(51) Int. Cl.
*G02B 27/00* (2006.01)
*G02B 27/10* (2006.01)

(56) References Cited

U.S. PATENT DOCUMENTS

| | | | |
|---|---|---|---|
| 7,936,392 B2 | 5/2011 | Ng et al. | |
| 7,949,252 B1 | 5/2011 | Georgiev | |
| 8,189,089 B1 | 5/2012 | Georgiev et al. | |
| 8,264,546 B2 | 9/2012 | Witt | |
| 8,289,440 B2 | 10/2012 | Knight et al. | |
| 8,290,358 B1 | 10/2012 | Georgiev | |
| 8,427,548 B2 | 4/2013 | Lim et al. | |
| 8,442,397 B2 | 5/2013 | Kang et al. | |
| 8,531,581 B2* | 9/2013 | Shroff | H04N 5/23212 348/335 |
| 8,559,705 B2 | 10/2013 | Ng | |
| 8,570,426 B2 | 10/2013 | Pitts et al. | |
| 8,724,014 B2 | 5/2014 | Ng et al. | |
| 8,749,620 B1 | 6/2014 | Knight et al. | |
| 8,811,769 B1 | 8/2014 | Pitts et al. | |
| 8,831,377 B2 | 9/2014 | Pitts et al. | |
| 8,948,545 B2* | 2/2015 | Akeley | H04N 9/045 382/312 |
| 2005/0031203 A1 | 2/2005 | Fukuda | |
| 2006/0256226 A1* | 11/2006 | Alon | G02B 27/0012 348/335 |
| 2007/0071316 A1 | 3/2007 | Kubo | |
| 2007/0230944 A1 | 10/2007 | Georgiev | |
| 2007/0252074 A1 | 11/2007 | Ng et al. | |
| 2008/0131019 A1 | 6/2008 | Ng | |
| 2009/0128669 A1 | 5/2009 | Ng et al. | |
| 2010/0026852 A1 | 2/2010 | Ng et al. | |
| 2010/0141802 A1 | 6/2010 | Knight et al. | |
| 2011/0129165 A1 | 6/2011 | Lim et al. | |
| 2012/0050562 A1 | 3/2012 | Perwass et al. | |
| 2012/0249550 A1 | 10/2012 | Akeley et al. | |
| 2012/0287296 A1 | 11/2012 | Fukui | |
| 2012/0300091 A1* | 11/2012 | Shroff | H04N 5/23212 348/222.1 |
| 2012/0327222 A1 | 12/2012 | Ng et al. | |
| 2013/0113981 A1 | 5/2013 | Knight et al. | |
| 2013/0128081 A1 | 5/2013 | Georgiev et al. | |
| 2013/0222606 A1 | 8/2013 | Pitts et al. | |
| 2013/0222652 A1 | 8/2013 | Akeley et al. | |
| 2013/0286236 A1 | 10/2013 | Mankowski | |
| 2014/0002699 A1* | 1/2014 | Guan | G02B 13/16 348/273 |
| 2014/0146201 A1 | 5/2014 | Knight et al. | |
| 2014/0176592 A1 | 6/2014 | Wilburn et al. | |

OTHER PUBLICATIONS

Dowski, Jr., Edward R., "Extended depth of field through wave-front coding", Applied Optics, vol. 34, No. 11, Apr. 10, 1995, pp. 1859-1866.

Georgiev, Todor, et al., "Superresolution with Plenoptic 2.0 Cameras", Optical Society of America 2009, pp. 1-3.

Heide, Felix, et al., "High-Quality Computational Imaging Through Simple Lenses", ACM Transactions on Graphics, SIGGRAPH 2013, pp. 1-7.

Huang, Fu-Chung, et al., "Eyeglasses-free Display: Towards Correcting Visual Aberrations with Computational Light Field Displays", ACM Transaction on Graphics, Aug. 2014, pp. 1-12.

Levoy, Marc, "Light Field Photography and Videography", Oct. 18, 2005.

Lumsdaine et al., "Full Resolution Lightfield Rendering" Adobe Technical Report Jan. 2008, pp. 1-12.

"Raytrix Lightfield Camera", Raytrix GmbH, Germany 2012, pp. 1-35.

Adaptive optics: http://http://en.wikipedia.org/wiki/Adaptive_optics. Retrieved Feb. 2014.

* cited by examiner

PLENOPTIC CAMERA RESOLUTION

CROSS-REFERENCE TO RELATED APPLICATIONS

The present application claims the benefit of U.S. Provisional Application Ser. No. 61/920,709 for "Plenoptic Camera Resolution Using an Aberrated Main Lens", filed Dec. 24, 2013, the disclosure of which is incorporated herein by reference in its entirety.

The present application claims the benefit of U.S. Provisional Application Ser. No. 61/920,710 for "Light Field Aberration Correction", filed Dec. 24, 2013, the disclosure of which is incorporated herein by reference in its entirety.

The present application is related to U.S. Utility application Ser. No. 12/278,708, for "Correction of Optical Aberrations", filed Jan. 26, 2009, now U.S. Pat. No. 8,243,157, the disclosure of which is incorporated herein by reference in its entirety.

The present application is related to U.S. Utility application Ser. No. 13/774,971, for "Compensating for Variation in Microlens Position During Light-Field Image Processing", filed Feb. 22, 2013, the disclosure of which is incorporated herein by reference in its entirety.

The present application is related to U.S. Utility application Ser. No. 13/774,925 for "Compensating for Sensor Saturation and Microlens Modulation During Light-Field Image Processing", filed Feb. 22, 2013, the disclosure of which is incorporated herein by reference in its entirety.

The present application is related to U.S. Utility application Ser. No. 13/688,026, for "Extended Depth of Field and Variable Center of Perspective in Light-Field Processing", filed Nov. 28, 2012, the disclosure of which is incorporated herein by reference in its entirety.

The present application is related to U.S. Utility application Ser. No. 14/573,319 for "Light Field Aberration Correction", filed on the same date as the present application, the disclosure of which is incorporated herein by reference in its entirety.

TECHNICAL FIELD

The present disclosure relates to systems and methods for designing light-field image capture devices, and more specifically, to systems and methods for optimizing the variables of main lenses and/or phase masks for light-field image capture devices.

BACKGROUND

The lens of a camera has a great impact on the ability of the camera to capture images. More specifically, the camera lens affects the zoom capabilities of the camera as well as the sharpness and resolution of the resulting image. For a traditional camera, the lens is often designed to focus the light received through the lens on the image sensor.

Lens design for light-field cameras is significantly different than for a traditional camera. The resolving power of a traditional camera is a function of its lens and the sensor. In order for the lens to not limit the resolving power of the system, the focus spot size of the lens must be equal to or smaller than the grain size of the film or the pixel size of the detector over the full size of the image plane.

By contrast, the resolving power of a light-field camera is dependent on a multitude of factors including, for example, the main lens, where the main lens is focused, the microlens array, the sensor's pixel size, and the sensor's pixel angular sensitivity. Optimization of lenses for light-field cameras thus presents unique challenges: In many cases, an optimized main lens for a light-field camera is not necessarily one which produces the smallest possible spot size.

SUMMARY

According to various embodiments, the system and method of the technology described herein facilitate the optimization of light-field camera components, and particularly main lens and phase mask components. The lens system may be optimized to enhance camera resolution. Various embodiments provide improved systems and methods for designing and/or optimizing the main lens, phase mask, and/or other variables.

According to one method, setup may be performed prior to initiation of the optimization process. One or more test field points and/or test reconstruction plane locations may be selected by a user to be used to evaluate the effectiveness of each camera configuration during the performance of the optimization process. Further, a camera design to be optimized may have a plurality of attributes. One or more of these may be selected by the user to be used as variables in the optimization process. A first set of variables may be selected and used as an initial configuration.

The optimization process may include calculation of an initial merit value for the initial configuration. The system may then be perturbed by changing one or more of the variables to generate a new configuration. A new merit value may then be calculated for the new configuration. The new merit value may be compared with the initial merit value. Based on results of the comparison, the system may again be perturbed to generate another new configuration. The system may iterate through cycles such that, in each cycle, a new configuration is generated, evaluated, and compared with the previous configuration. This process may continue until the method arrives at an optimal configuration in which further perturbation of the variables will not lead to improvements in performance.

The merit function may be calculated by selecting a test field point and a test reconstruction plane location from among the test field points and test reconstruction plane locations specified by the user. The configuration may be passed to a simulator, which may generate a ray correction function to map light-field data for the configuration to idealized results. A target may be placed in object space and scaled so that its image corresponds to the conjugate field and reconstruction plane location in image space. The configuration may be ray-traced to produce a simulated captured light-field, which may be refocused to a corresponding reconstruction plane location. An optical transfer function may be calculated and used to obtain the desired values.

Other test field points and/or test reconstruction plane locations may be selected until all of the test field points and test reconstruction plane locations have been assessed. The resulting merit function value may be generated based on the values obtained from calculation of the optical transfer functions. The merit function value may then be used in the optimization process as described previously.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DEFINITIONS

Figure 1:
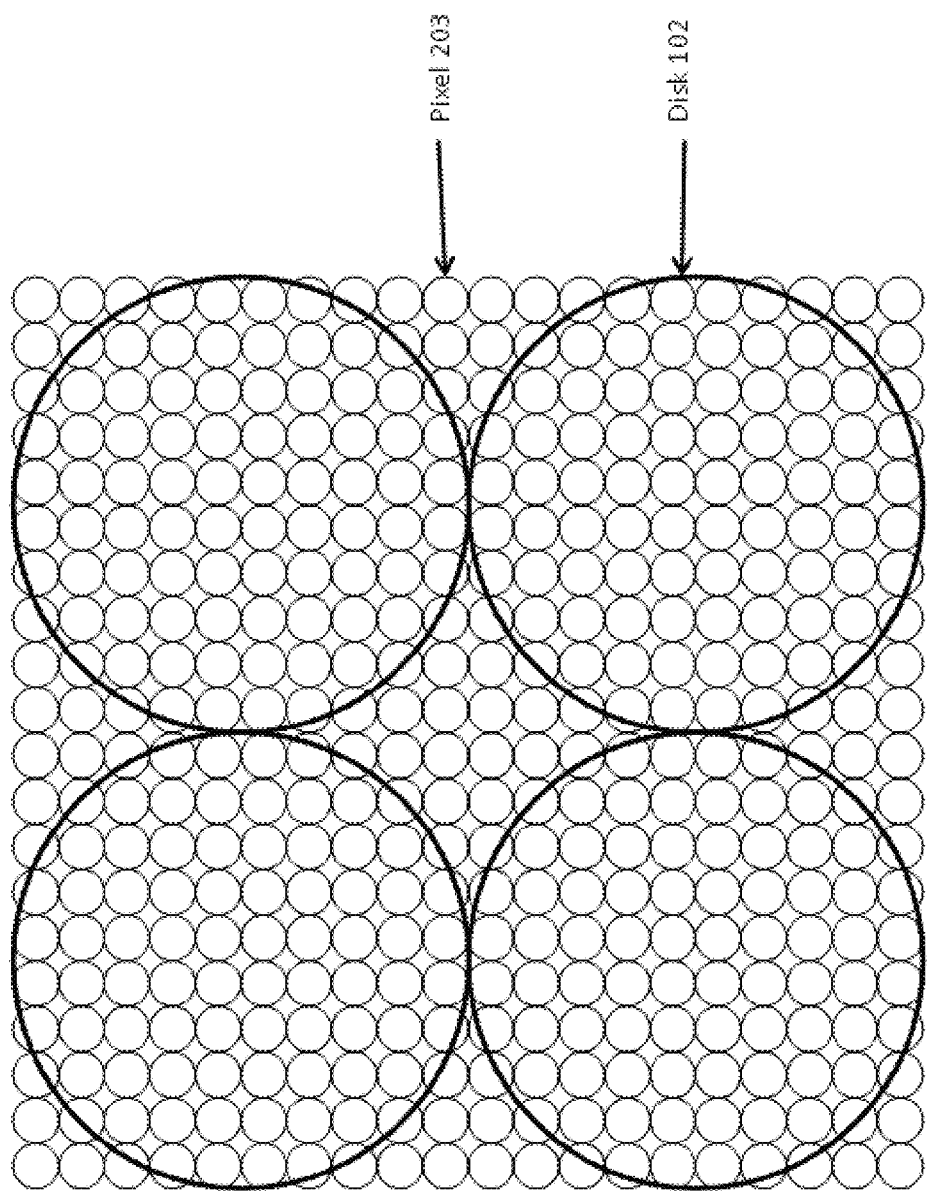
FIG. 1 depicts a portion of a light-field image.

For purposes of the description provided herein, the following definitions are used:

aberration: an accidentally or deliberately produced feature of a main lens that results in departure of the main lens from the characteristics of an ideal lens.

attribute: a characteristic of a camera design.

configuration: a camera design defined by a specific set of values for variables of the attributes of the camera design.

depth: a representation of displacement between an object and/or corresponding image sample and a microlens array of a camera.

depth map: a two-dimensional map corresponding to a light-field image, indicating a depth for each of multiple pixel samples within the light-field image.

disk: a region in a light-field image that is illuminated by light passing through a single microlens; may be circular or any other suitable shape.

extended depth of field (EDOF) image: an image that has been processed to have objects in focus along a greater depth range.

field point: a specific location on an image sensor.

image: a two-dimensional array of pixel values, or pixels, each specifying a color.

image processing algorithm: any computer-implemented procedure for modifying an image.

lambda ($\lambda$): a distance equivalent to the focal length of a microlens of a microlens array.

light-field image: an image that contains a representation of light-field data captured at the sensor.

main lens: the optical structure or structures through which light enters a camera, prior to impinging on a microlens array or sensor.

merit function: an algorithm that can be applied to a camera design to generate one or more merit function values.

merit function values: values descriptive of the performance of a camera design; preferred merit function values may be larger or smaller.

microlens: a small lens, typically one in an array of similar microlenses.

perturb: a procedure by which a system, configuration, and/or variable is altered in a measured manner for comparison purposes.

phase mask: a camera component used in conjunction with a main lens to impart a phase shift on the wavefront of light.

ray correction function: a function that converts between four-dimensional light ray coordinates in actual image space corresponding to the use of an actual main lens, and four-dimensional light ray coordinates in ideal space corresponding to the use of an ideal main lens.

reconstruction plane: a plane within a light-field at which a light-field image is to be generated.

reconstruction plane location: the location of a reconstruction plane, usually expressed in terms of displacement (in multiples of lambda) from a microlens array.

simulated captured light-field: a representation of a light-field captured by simulation of performance of a configuration of a light-field camera.

variable: a metric that can be used to measure an attribute and can be varied to alter performance of the camera.

weight: a numerical representation of the importance accorded to a specific component in the construction of a combination of components.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for designing and/or selecting light-field camera components are described. One skilled in the art will recognize that these various techniques and methods can be performed singly and/or in any suitable combination with one another.

Architecture

Figure 2:
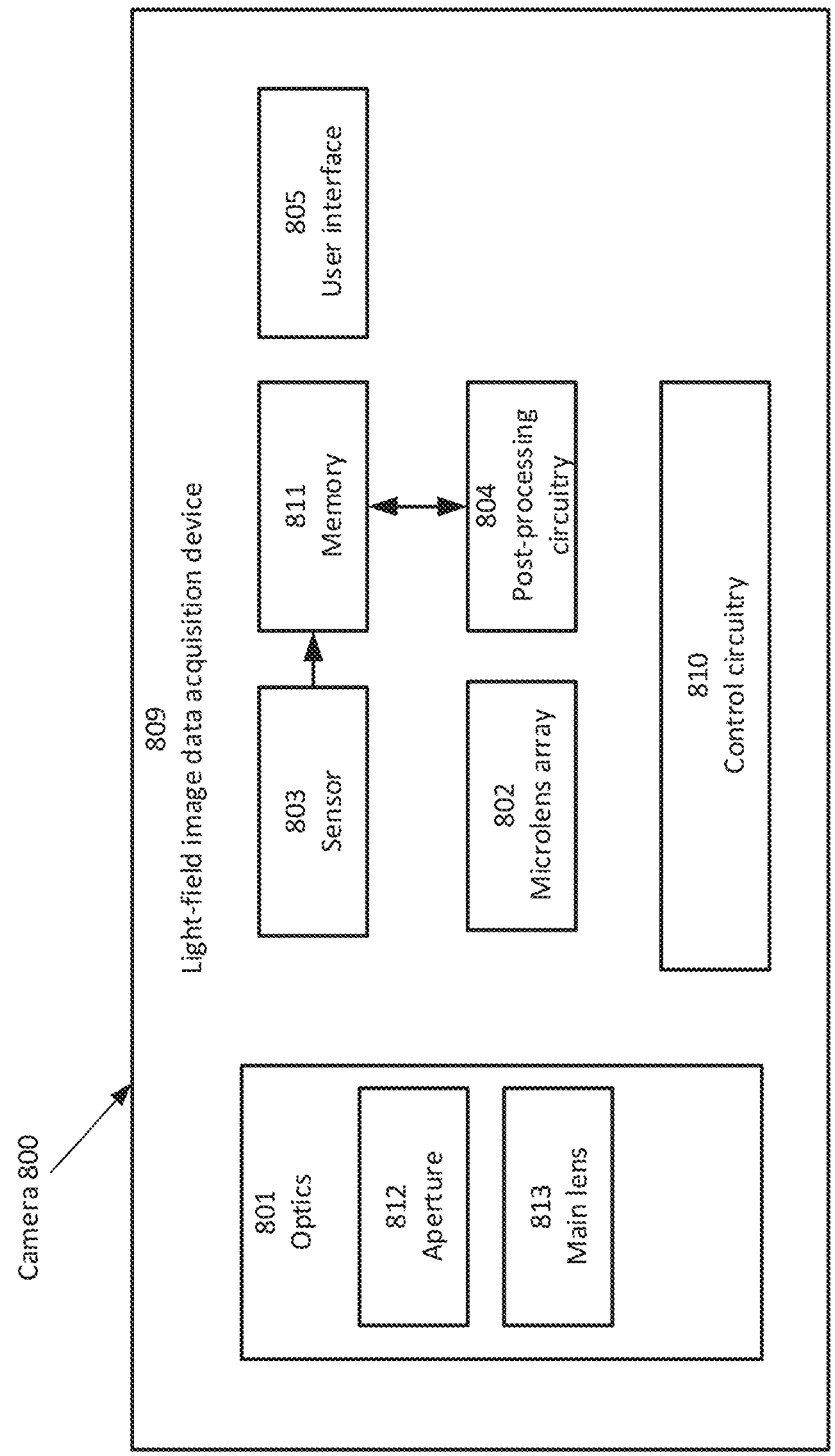
FIG. 2 depicts an example of an architecture for a light-field capture device, according to one embodiment.
Figure 3:
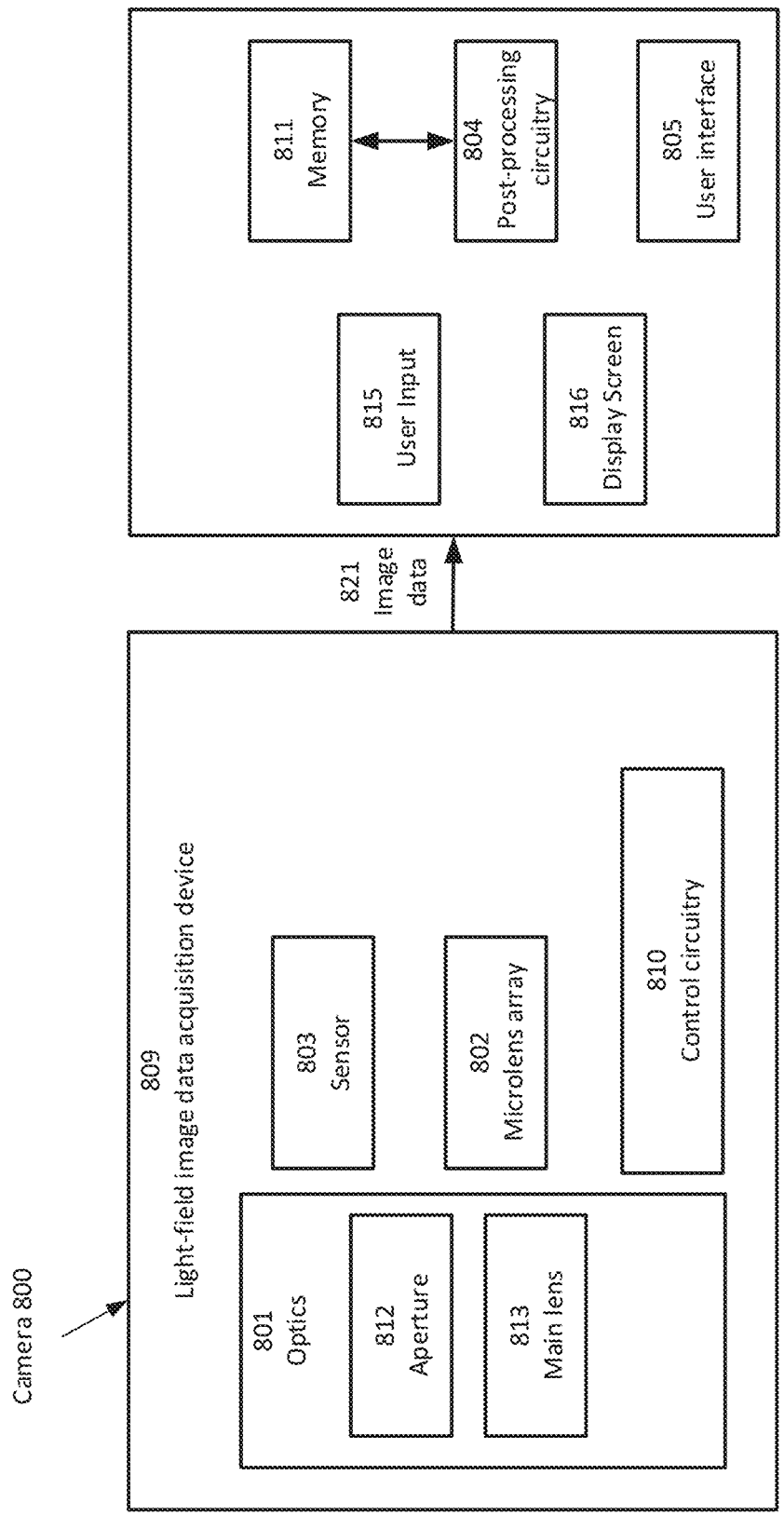
FIG. 3 depicts an example of an architecture for implementing post-processing in a post-processing system communicatively coupled to a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 2, there is shown a block diagram depicting a light-field capture device such as a camera 800. Referring now also to FIG. 3, there is shown a block diagram depicting an architecture for implementing post-processing in a post-processing system communicatively coupled to a light-field capture device such as a camera 800, according to one embodiment. One skilled in the art will recognize that the particular configurations shown in FIGS. 2 and 3 are merely exemplary, and that other architectures are possible for camera 800. One skilled in the art will further recognize that several of the components shown in the configurations of FIGS. 2 and 3 are optional, and may be omitted or reconfigured.

Figure 4:
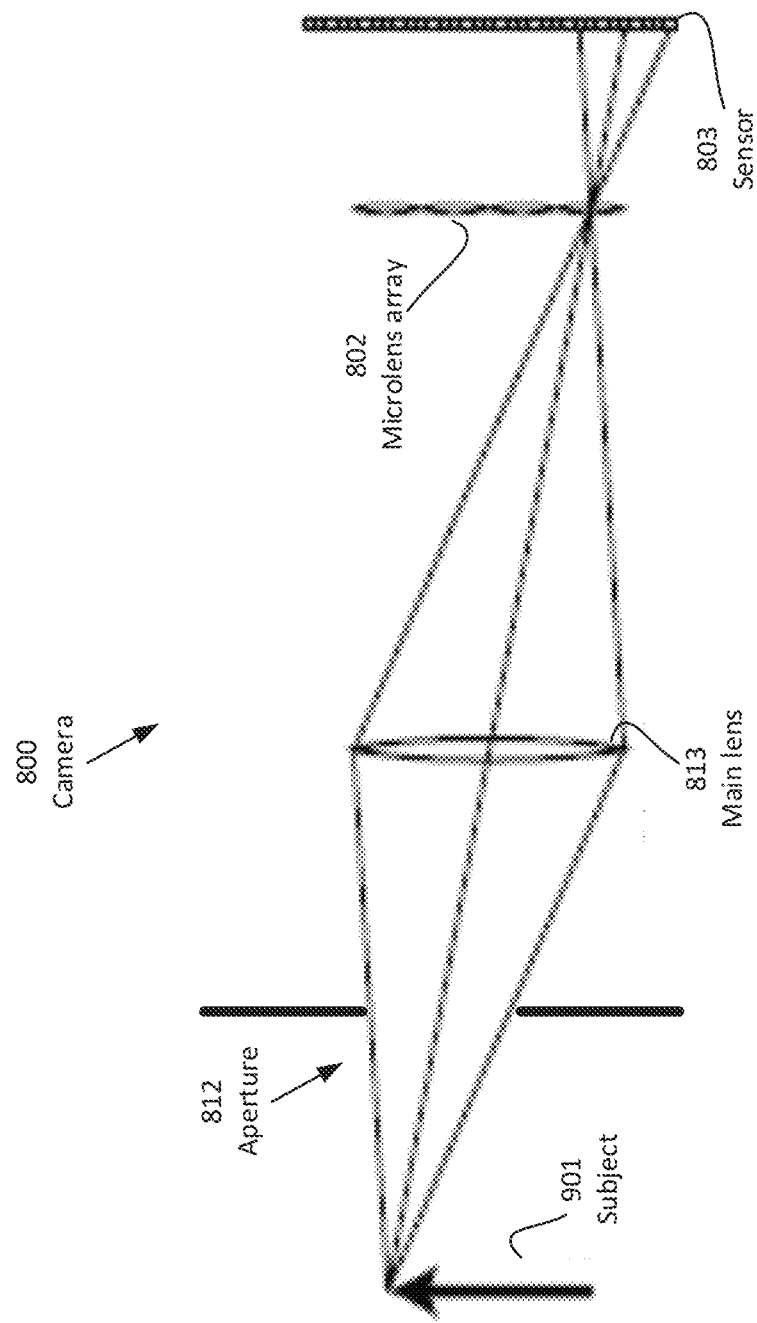
FIG. 4 depicts an example of an architecture for a light-field camera according to one embodiment.

In at least one embodiment, camera 800 may be a light-field camera that includes light-field image data acquisition device 809 having optics 801, image sensor 803 (including a plurality of individual sensors for capturing pixels), and microlens array 802. Optics 801 may include, for example, aperture 812 for allowing a selectable amount of light into camera 800, and main lens 813 for focusing light toward microlens array 802. In at least one embodiment, microlens array 802 may be disposed and/or incorporated in the optical path of camera 800 (between main lens 813 and sensor 803) so as to facilitate acquisition, capture, sampling of, recording, and/or obtaining light-field image data via sensor 803. Referring now also to FIG. 4, there is shown an example of an architecture for a light-field camera 800 for implementing the method of the present disclosure according to one embodiment. The Figure is not shown to scale. FIG. 4 shows, in conceptual form, the relationship between aperture 812, main lens 813, microlens array 802, and sensor 803, as such components interact to capture light-field data for subject 901.

In at least one embodiment, light-field camera 800 may also include a user interface 805 for allowing a user to provide input for controlling the operation of camera 800 for capturing, acquiring, storing, and/or processing image data.

In at least one embodiment, light-field camera 800 may also include control circuitry 810 for facilitating acquisition, sampling, recording, and/or obtaining light-field image data. For example, control circuitry 810 may manage and/or control (automatically or in response to user input) the acquisition timing, rate of acquisition, sampling, capturing, recording, and/or obtaining of light-field image data.

In at least one embodiment, camera 800 may include memory 811 for storing image data, such as output by image sensor 803. Such memory 811 can include external and/or internal memory. In at least one embodiment, memory 811 can be provided at a separate device and/or location from camera 800.

For example, camera 800 may store raw light-field image data, as output by sensor 803, and/or a representation thereof, such as a compressed image data file. In addition, as described in related U.S. Utility application Ser. No. 12/703,367 for "Light-field Camera Image, File and Configuration Data, and Method of Using, Storing and Communicating Same,", filed Feb. 10, 2010, memory 811 can also store data representing the characteristics, parameters, and/or configurations (collectively "configuration data") of device 809.

In at least one embodiment, captured image data is provided to post-processing circuitry 804. Such circuitry 804 may be disposed in or integrated into light-field image data acquisition device 809, as shown in FIG. 2, or it may be in a separate component external to light-field image data acquisition device 809, as shown in FIG. 3. Such separate component may be local or remote with respect to light-field image data acquisition device 809. Any suitable wired or wireless protocol can be used for transmitting image data 821 to circuitry 804; for example, camera 800 can transmit image data 821 and/or other data via the Internet, a cellular data network, a Wi-Fi network, a Bluetooth communication protocol, and/or any other suitable means.

Such a separate component may include any of a wide variety of computing devices, including but not limited to computers, smartphones, tablets, cameras, and/or any other device that processes digital information. Such a separate component may include additional features such as a user input 815 and/or a display screen 816. If desired, light-field image data may be displayed for the user on the display screen 816.

The system and method of the present disclosure may be implemented on the camera 800 of FIG. 2 and/or on the post-processing system of FIG. 3. Alternatively, the system and method can be implemented on any electronic device equipped to receive, store, and present information. Such an electronic device may be, for example, a desktop computer, laptop computer, smartphone, tablet computer, or the like.

Although the system is described herein in connection with an implementation in a computer, one skilled in the art will recognize that the techniques described herein can be implemented in other contexts, and indeed in any suitable device capable of receiving and/or processing user input. Accordingly, the following description is intended to illustrate various embodiments by way of example, rather than to limit scope.

Figure 5:
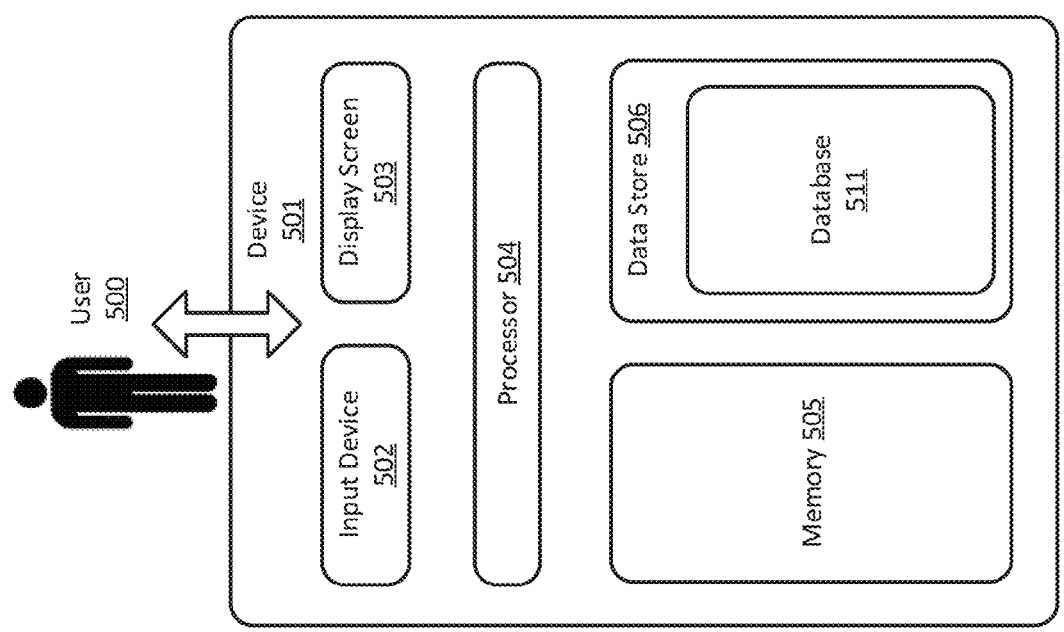
FIG. 5 is a block diagram depicting a hardware architecture for practicing the described method, according to one embodiment.

Referring to FIG. 5, there is shown a block diagram depicting a hardware architecture for practicing the described method, according to one embodiment. Such an architecture can be used, for example, for implementing the techniques of the system in a computer or other device 501. Device 501 may be any electronic device equipped to receive, store, and/or present information, and to receive user input in connect with such information.

In at least one embodiment, device 501 has a number of hardware components well known to those skilled in the art. Input device 502 can be any element that receives input from user 500, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Data store 506 can be any magnetic, optical, or electronic storage device for data in digital form; examples include flash memory, magnetic hard drive, CD-ROM, DVD-ROM, or the like. In at least one embodiment, data store 506 stores information which may include one or more databases, referred to collectively as a database 511, that can be utilized and/or displayed according to the techniques described below. In another embodiment, database 511 can be stored elsewhere, and retrieved by device 501 when needed for presentation to user 500. Database 511 may include one or more data sets, which may be used for a variety of purposes and may include a wide variety of files, metadata, and/or other data.

Display screen 503 can be any element that graphically displays information such as items from database 511, and/or the results of steps performed on such items to provide information useful to a user. Such output may include, for example, raw data, data visualizations, illustrations of light-field camera components, or the like. Such information may be displayed by the display screen 503 in a wide variety of formats, including but not limited to lists, charts, graphs, and the like. In at least one embodiment where only some of the desired output is presented at a time, a dynamic control, such as a scrolling mechanism, may be available via input device 502 to change which information is currently displayed, and/or to alter the manner in which the information is displayed.

Processor 504 can be a conventional microprocessor for performing operations on data under the direction of software, according to well-known techniques. Memory 505 can be random-access memory, having a structure and architecture as are known in the art, for use by processor 504 in the course of running software.

Data store 506 can be local or remote with respect to the other components of device 501. In at least one embodiment, device 501 is configured to retrieve data from a remote data storage device when needed. Such communication between device 501 and other components can take place wirelessly, by Ethernet connection, via a computing network such as the Internet, via a cellular network, or by any other appropriate means. This communication with other electronic devices is provided as an example and is not necessary.

In at least one embodiment, data store 506 is detachable in the form of a CD-ROM, DVD, flash drive, USB hard drive, or the like. Database 511 can be entered from a source outside of device 501 into a data store 506 that is detachable, and later displayed after the data store 506 is connected to device 501. In another embodiment, data store 506 is fixed within device 501.

In one embodiment, the system of the present disclosure may be implemented as software written in any suitable computer programming language, whether in a standalone or client/server architecture. Alternatively, it may be implemented and/or embedded in hardware.

Light-Field Overview

Light-field images often include a plurality of projections (which may be circular or of other shapes) of aperture 812 of camera 800, each projection taken from a different vantage point on the camera's focal plane. The light-field image may be captured on sensor 803. The interposition of microlens array 802 between main lens 813 and sensor 803 causes images of aperture 812 to be formed on sensor 803, each microlens in array 802 projecting a small image of main-lens aperture 812 onto sensor 803. These aperture-shaped projections are referred to herein as disks, although they need not be circular in shape. The term "disk" is not intended to be limited to a circular region, but can refer to a region of any shape.

Light-field images include four dimensions of information describing light rays impinging on the focal plane of camera 800 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x, y, u, v) resolution of (400, 300, 10, 10). Referring now to FIG. 1, there is shown an example of a 2-disk by 2-disk portion of such a light-field image, including depictions of disks 102 and individual pixels 203; for illustrative purposes, each disk 102 is ten pixels 203 across.

In at least one embodiment, the 4-D light-field representation may be reduced to a 2-D image through a process of projection and reconstruction. As described in more detail in related U.S. Utility application Ser. No. 13/774,971 for "Compensating for Variation in Microlens Position During Light-Field Image Processing," filed Feb. 22, 2013, the disclosure of which is incorporated herein by reference in its entirety, a virtual surface of projection may be introduced, and the intersections of representative rays with the virtual surface can be computed. The color of each representative ray may be taken to be equal to the color of its corresponding pixel.

Any number of image processing techniques can be used to reduce color artifacts, reduce projection artifacts, increase dynamic range, and/or otherwise improve image quality. Examples of such techniques, including for example modulation, demodulation, and demosaicing, are described in related U.S. application Ser. No. 13/774,925 for "Compensating for Sensor Saturation and Microlens Modulation During Light-Field Image Processing", filed Feb. 22, 2013, the disclosure of which is incorporated herein by reference.

In particular, processing can be performed on enhanced depth-of-field (EDOF) image in which all parts of the image are in focus. However, such processing steps may be of limited use in conventional operation on EDOF images, because the depth map accuracy as well as the light-field data itself can have strong depth-dependent variation in terms of sampling, prefiltering, and noise level. Processing the entire EDOF output as a single 2D image can result in unwanted artifacts, especially when highly spatially-unstable processing techniques are used in enhancing the image. Accordingly, in at least one embodiment, a layered image processing technique is used.

Light-Field Ray Correction Functions

As discussed in R. Ng, "Digital Light Field Photography," Dissertation, Department of Computer Science, Stanford University, June 2006 and in Ng et al., U.S. patent application Ser. No. 12/278,708, for "Correction of Optical Aberrations", filed Jan. 26, 2009, a light-field camera can digitally correct for aberrations of the main lens. In a traditional 2D camera, aberration in the lens causes the lens to focus to a large spot size, resulting in reduced resolving power.

In a light-field camera, however, the light-field sensor measures small bundles of rays from different portions of the exit pupil. Prior knowledge of the lens system allows the measured ray bundles to be digitally re-sorted to mimic any desired lens configuration. For example, the rays can be re-sorted to match an ideal lens system and therefore maximize the resolving power of the system. This also has the effect of removing (or reducing) other non-idealities, such as distortion, from the lens.

The following is an example of a procedure that can be used to find the mapping between the actual and ideal lens systems. What the camera physically records is termed the aberrated ray space, denoted by coordinates (x', y', u', v'); these coordinates can be unambiguously remapped into an ideal ray space (x, y, u, v). The mapping between these two spaces can be computed by knowing the design of the lens and tracing rays outward from the center of each pixel on the sensor.

Figure 6:
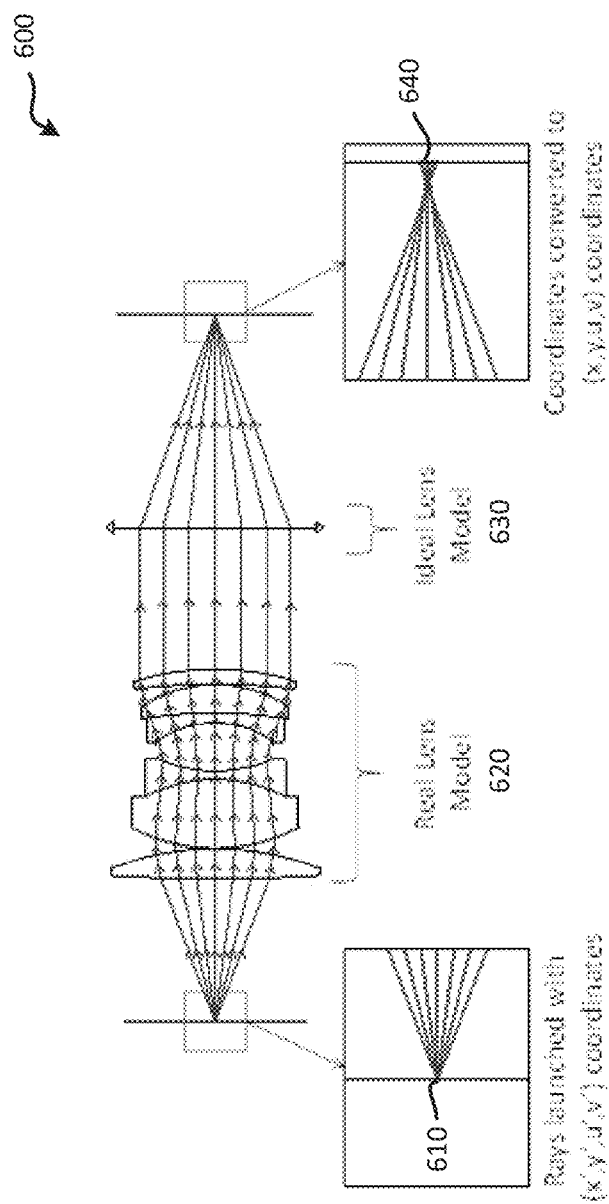
FIG. 6 is a diagram illustrating an example of mapping coordinates between real and idealized lens systems.

An example of mapping coordinates between real and idealized lens systems is illustrated in a diagram 600 in FIG. 6, with reference to the center pixel. The rays are launched at an origin 610. The rays are traced through all of the elements of the real lens 620 into the real world. The rays are then traced through a corresponding ideal model of the ideal lens 630. The rays terminate at a terminus 640 on a sensor plane, and the rays' 4D coordinates are recorded. The difference between the 4D coordinate the ray was launched with (i.e., at the origin 610) and the 4D coordinate it terminates at (i.e., at the terminus 640) is the correction vector for that specific pixel. This process defines what is called the ray correction function.

Ideal Lenses

Figure 7:
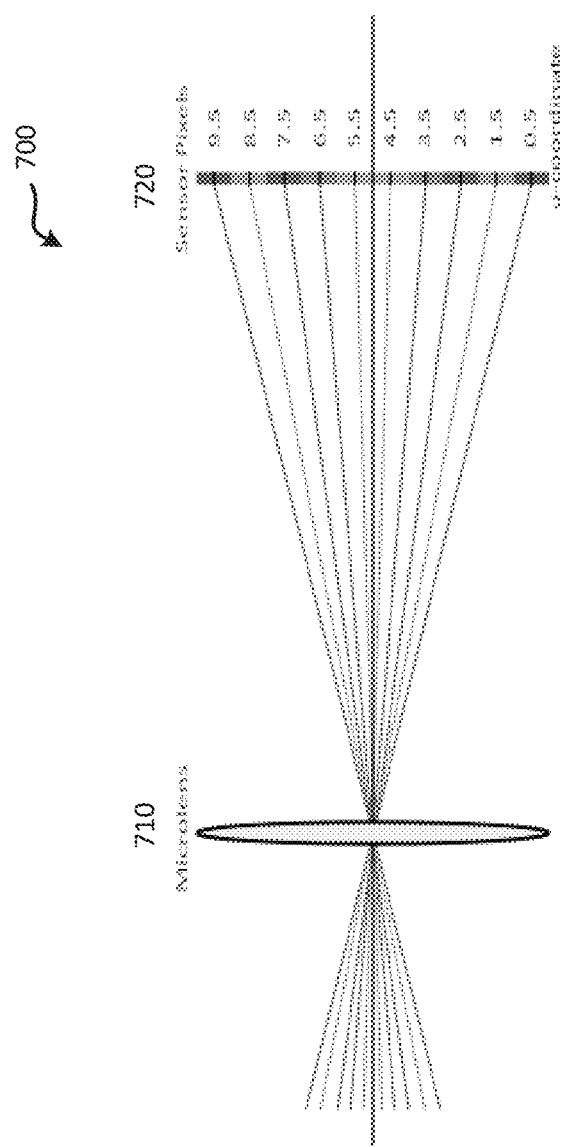
FIG. 7 is a diagram depicting rays coming from an ideal main lens and focused perfectly on a single microlens in the light-field sensor.

An ideal lens has the property of mapping points in world coordinates to points in image coordinates. This means that it has a perfect focus of zero width, neglecting diffraction. FIG. 7 is a diagram 700 depicting rays coming from an ideal main lens (not shown) and focused perfectly on a single microlens 710 proximate the light-field sensor 720. A cross-section of the microlens is shown. During projection, the samples are splatted into the reconstructed image based on their 4D coordinates and the plane of the reconstruction. The location of the plane of reconstruction is defined in units of "lambda" ($\lambda$). This unit lambda has a physical distance equivalent to the focal length of the microlens. The origin of the system is at the plane of the microlenses and is defined as $\lambda=0$.

Figure 8:
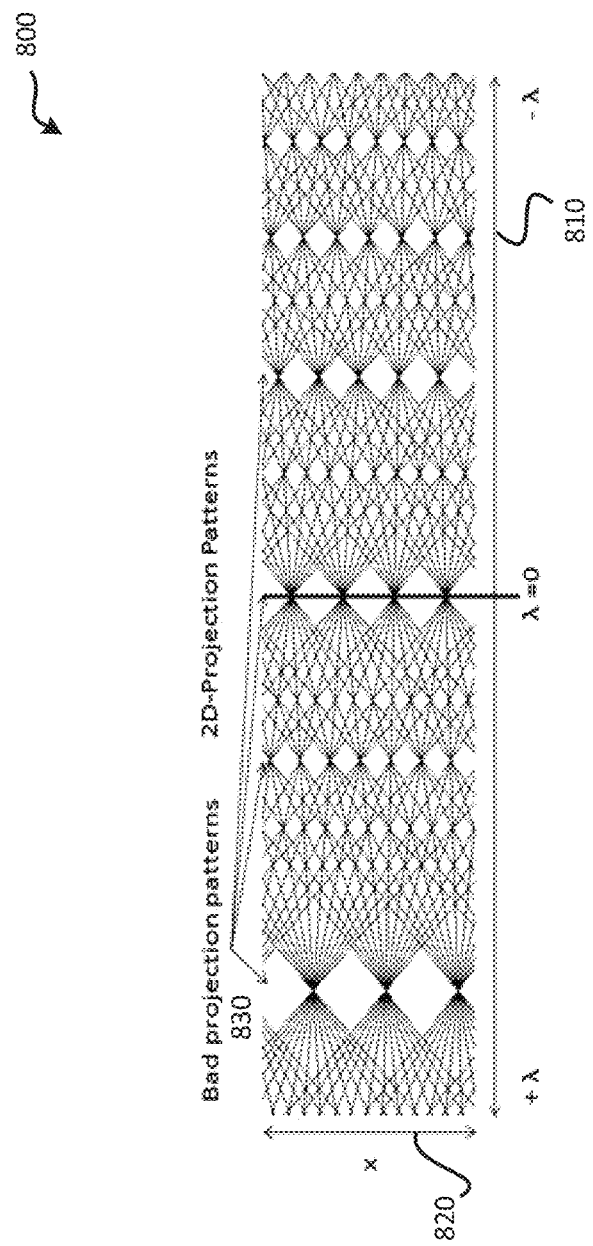
FIG. 8 is a diagram illustrating a projection pattern cross-section for an ideal lens with no aberration.

Projection pattern cross-sections are an intuitive way to understand the projection patterns as a function of lambda. FIG. 8 is a diagram 800 showing a projection pattern cross-section for an ideal lens with no aberration. The horizontal axis 810 shows the pattern with lambda and the vertical axis 820 is a cross-section through the center of the lens. As shown, many planes 830 may have bad (i.e., non-uniform) projection patterns.

When the rays are projected to $\lambda=0$, all of the samples are degenerate. Therefore in the reconstructed 2D output image the only data present is at the geometric center of each microlens. This fundamentally limits the resolution of the image at $\lambda=0$ to the resolution of the microlens ray itself. This is termed the "lambda zero hole" in resolution. There are many other lambda values where the sampling patterns are highly degenerate and similarly limit the resolution of the reconstruction.

Figure 9:
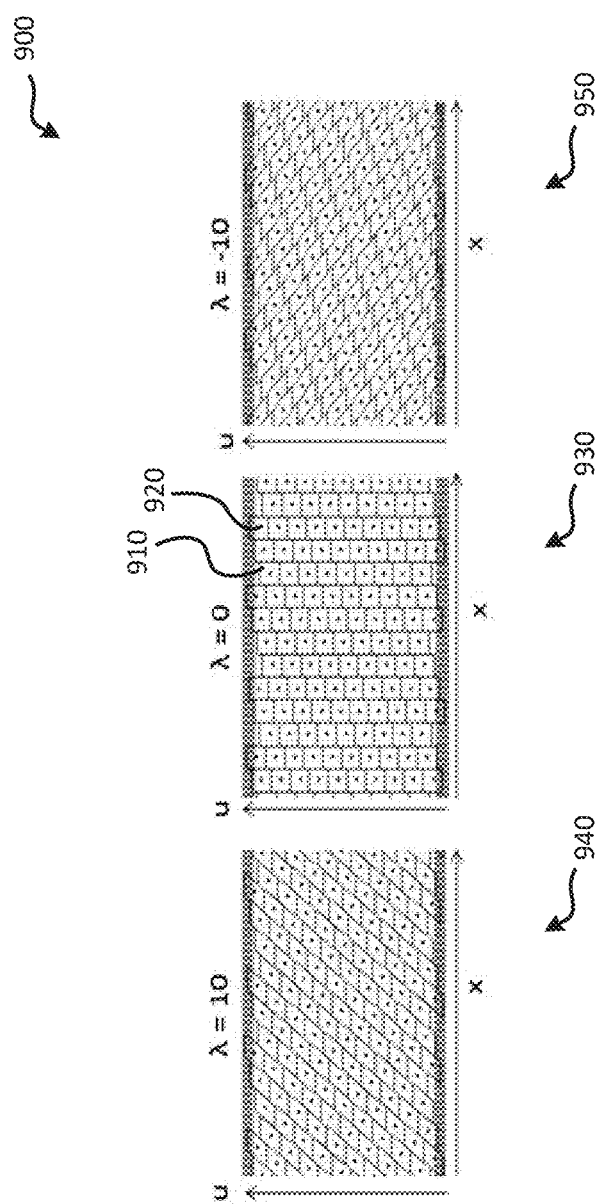
FIG. 9 is a ray space diagram illustrating another visualization of the 4D space, for an ideal lens with no aberration.

Another visualization of the 4D space, called a ray space diagram 900, is shown in FIG. 9. A column of boxes 910 corresponds to all of the rays striking a single microlens along its diameter in the x-direction. Each box in the column corresponds to a single pixel. The dot 920 in the center of each box represents the pixel's geometric center. The columns are offset slightly due to the hexagonal packing of the microlenses. The width and height of each box correspond to the spatial and angular width the pixel will integrate across in the real-world scene. Therefore, a wider/taller box corresponds to a lower resolution pixel as at will integrate over a larger physical extent in the scene.

The center diagram 930 in FIG. 9 depicts an ideal main lens with the reconstruction plane at $\lambda=0$. At this plane, the boxes are perfect rectangles and of equal height and width. The diagrams to the left 940 and right 950 are at reconstruction planes of $\lambda=+10$ and $\lambda=-10$ respectively. Changing the location of the reconstruction plane, an operation that is commonly called refocusing, is equivalent to shearing the ray space diagrams clockwise or counterclockwise for positive or negative changes in lambda respectively. The area each pixel integrates over is now elongated equally in the x direction for the +10 and −10 diagrams. This widening again corresponds to a larger spatial area in the scene, and therefore a lower resolution. This is a fundamental property of light-field cameras that limits the total range of refocusability, because as the reconstruction plane is moved further and further from the optical focus at $\lambda=0$, the resolution deteriorates correspondingly.

Figure 10:
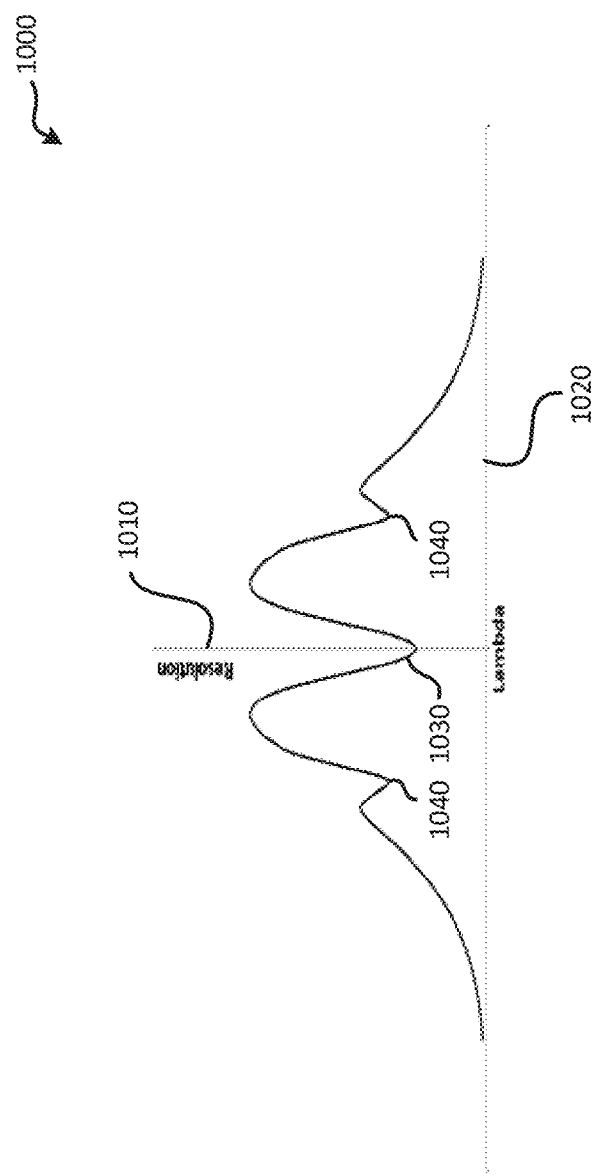
FIG. 10 is a mock diagram of the system resolution with an ideal main lens versus the selected plane of reconstruction in units of lambda.

FIGS. 8 and 9 illustrate different limitations of using ideal lenses in light-field cameras. The resultant resolution profile of the light-field camera is a combination of these limitations. FIG. 10 shows a mock diagram 1000 of the system resolution on a Y-axis 1010 with an ideal main lens versus the selected plane of reconstruction on an X-axis 1020, in units of lambda. The overall envelope of the function is determined by the change in pixel integration width with lambda. The larger central drop in resolution 1030 is due to the "lambda zero hole". The other small dips 1040 are from other highly degenerate projection patterns. The overall shape of the pattern shows that the resolution of the system decreases as it projects to increasingly large lambda values.

Mathematical Description of Ideal Lens

If the main lens is an ideal lens, the light-field camera would sample the light-field on a regular grid in the 4D space. The 4D coordinates $(s_i, t_i, u_i, v_i)$ of a sample $p_i$ are:

$$s_i = \text{Microlens}(p_i).x(\,),$$

$$t_i = \text{Microlens}(p_i).y(\,),$$

$$u_i = \text{Center}(\text{Microlens}(p_i)).x(\,) - p_i.x(\,),$$

$$v_i = \text{Center}(\text{Microlens}(p_i)).y(\,) - p_i.y(\,),$$

where (s, t) are the spatial coordinates defined on the microlens array plane, and (u, v) are the angular coordinates. Microlens($p_i$) identifies the microlens that covers pi. Center( ) computes the sensor plane coordinate at the center of a microlens. The function x( ) and y( ) returns the spatial coordinates of a microlens/sensor on the microlens array/sensor array plane.

When the light-field sample is projected to a specific reconstruction plane, $\lambda$, the 2D projected coordinate of a sample is $$x_i(\lambda) = s_i - \lambda u_i,$$

$$y_i(\lambda) = t_i - \lambda v_i.$$

We can see that in some cases, the distribution of the projected samples would be unfavorable, such as when $\lambda=0$, as shown in FIG. 10.

Figure 11:
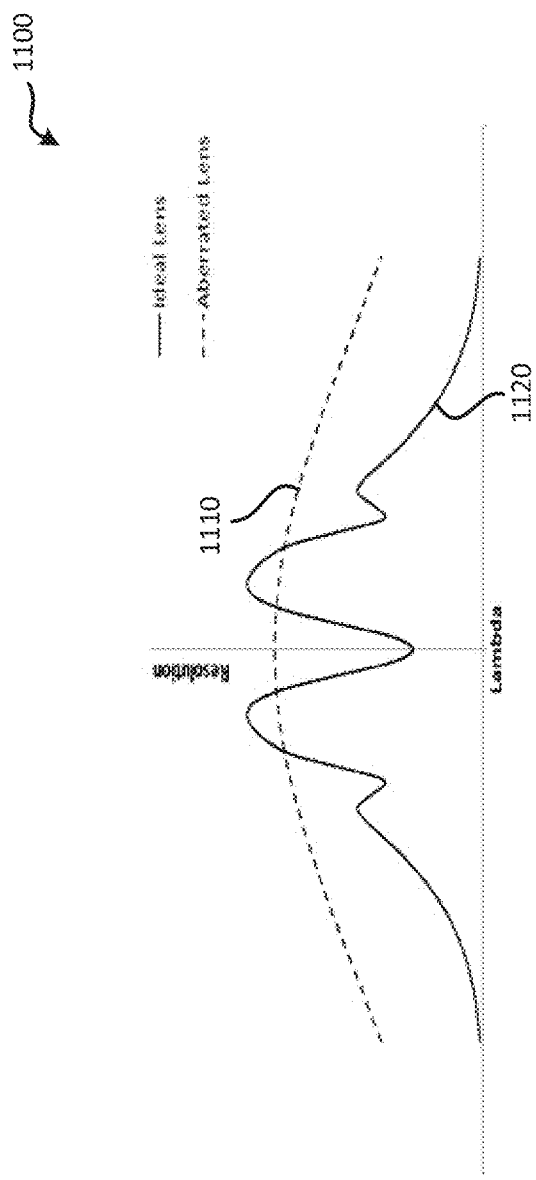
FIG. 11 is a diagram of resolution versus lambda for light-field cameras with ideal versus aberrated main lenses.

However, if aberration is introduced into the lens system, the 4D coordinates become less regular, and so similarly the projected coordinates. For example, if we add spherical aberration into the lens, the 4D coordinates $(s_i, t_i, u_i, v_i)$ become:

$$s_i = \text{Microlens}(p_i).x(\,) + \alpha(r_i)^3,$$

$$t_i = \text{Microlens}(p_i).y(\,) + \alpha(r_i)^3,$$

$$u_i = \text{Center}(\text{Microlens}(p_i)).x(\,) - p_i.x(\,),$$

$$v_i = \text{Center}(\text{Microlens}(p_i)).y(\,) - p_i.y(\,),$$

where $r_i = (u_i * u_i + v_i * v_i)^{0.5}$. In this way, the spatial coordinate becomes a non-linear function of the microlens geometry and the angular coordinate. If the angular coordinate is large enough, the projected coordinate deviates from the ideal coordinate sufficiently, causing samples to be quasi-randomly spaced in the reconstruction plane. In particular, a large enough change will eliminate the unfavorable reconstruction plane at $\lambda=0$. FIG. 11 is a diagram 1100 of resolution versus lambda for light-field cameras with ideal an ideal lens 1110 versus aberrated main lenses 1120.

Designing Lenses for Light-Field Cameras

The goal of traditional lens design is to design lenses that perform as close to the geometric ideal as possible. A lens designer has many options to improve the performance of a lens. Common options are increasing the number of elements, using higher index and lower dispersion glasses, and/or using aspherical surfaces. All of these options have the effect of adding more variables to the design to optimize against. In addition, many of these options have the effect of increasing the cost of a lens.

Lens design for light-field cameras differs from the traditional because, as discussed above, an ideal lens is actually a non-optimal solution. Adding aberration to the lens can improve the performance of the camera by quasi-randomizing the sample distribution at all reconstruction planes and by spreading sharp pixels across the refocusable range evenly.

The amount and type of aberration that should be introduced to the lens design depends on many factors such as the system f-number, diameter of the microlenses, focal length of the microlenses, and sensor pixel size. A rule of thumb is that that the root-mean-square spot size of the lens should be between one and three times the diameter of the microlenses, although other variations are possible.

In at least one embodiment, automatic lens design tools are used to find an optimal design. These tools iteratively test millions of designs very quickly against a defined merit function. The system automatically perturbs various system variables such as thickness, radii, index of refraction, Abbe number, and the like. For each of these variations, the system calculates a value based on some merit function, which may be user-defined. In at least one embodiment, the design programs include algorithms that attempt to move the system variables towards the optimum configuration in as few cycles as possible.

In at least one embodiment, the merit function relies on a simulation of target images. An example image may be a slant edge target, which consists of a black-to-white transition. By taking the 2D Fourier transform perpendicular to the edge of the resultant image, the optical transfer function of the system can be calculated. From the optical transfer function, differed values can be extracted, such as the modulation transfer function (MTF) at specific frequencies. For instance, the designer may be interested in the MTF at 10, 25, and 50 line pairs per millimeter.

The size of the target image is an important consideration. The larger the image, the slower the simulation will be as more rays need to be traced. However, if the target is too small, the measurement will not be valid as not enough of the light-field will be captured to produce an accurate reconstruction. The size of the target should also scale with the absolute value of lambda. In at least one embodiment, the image of the simulated target is approximately five times as large as the focus spot size at the given lambda.

Figure 12:
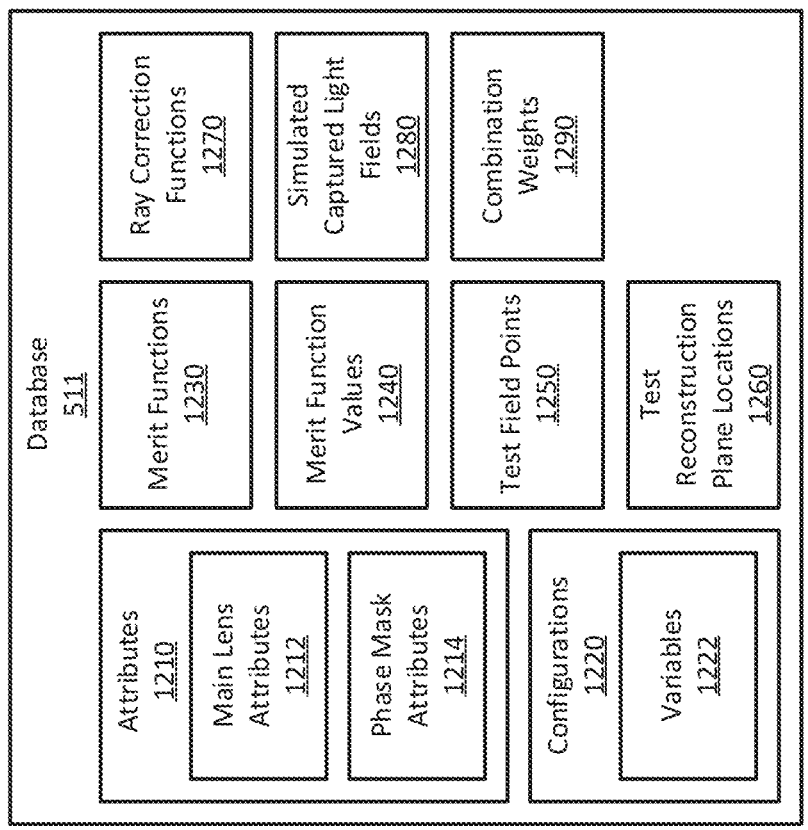
FIG. 12 a schematic block diagram illustrating the database 511, according to one embodiment.

FIG. 12 is a schematic block diagram illustrating the database 511 according to one embodiment. The database 511 may include various data structures, examples of which are illustrated in FIG. 12.

More specifically, the database 511 may include attributes 1210, configurations 1220, merit functions 1230, merit function values 1240, test field points 1250, test reconstruction plane locations 1260, ray correction functions 1270, simulated captured light-fields 1280, and/or combination weights 1290. These data structures relate to information and/or algorithms discussed herein, some of which have already been described.

The attributes 1210 may relate to various aspects of the design of a light-field camera such as the camera 800. For example, the attributes 1210 may include dimensions, materials selections, performance specifications, tolerances, and/or other metrics pertaining to various components of the camera 800. The attributes 1210 may advantageously include aspects of the camera 800 that can be modified and/or optimized according to the method of the present disclosure.

The attributes 1210 may include attributes pertaining to traditional two-dimensional (2D) cameras and/or attributes unique to light-field cameras. Attributes unique to light-field cameras may relate to, but are not limited to, the configuration of the microlens array and the position of the microlens array relative to the main lens and/or the image sensor.

In some embodiments, the attributes 1210 may include one or more main lens attributes 1212 related to the design of the main lens of the camera 800. Such main lens attributes 1212 include, but are not limited to, the thickness, the radius, the index of refraction, and the Abbe number of one or more components of the main lens.

Additionally or alternatively, the attributes 1210 may include one or more phase mask attributes 1214 related to the design of a phase mask of the camera 800. The phase mask may be used in conjunction with the main lens, as will be described subsequently. The phase mask attributes 1214 may include, for example, the parameters of the phase shift applied by the phase mask.

The configurations 1220 may be configurations of the camera 800. Thus, each of the configurations 1220 may include a number of variables 1222, each of which pertains to one of the attributes 1210. The variables 1222 may be computationally varied and/or optimized according to the method of the present disclosure. Each distinct combination of the variables 1222 may be a configuration 1220. The configurations 1220 may optionally include all configurations of the camera 800 that have been evaluated by the method of the present disclosure, or alternatively, only the best configurations and/or the configurations currently being compared may be retained in the configurations 1220.

The merit functions 1230 may include one or more algorithms used to evaluate the performance of the configurations 1220. Application of an exemplary merit function will be shown and described hereafter.

The merit function values 1240 may be the values obtained from application of the merit functions 1230 to the configurations 1220. Thus, the merit function values 1240 may optionally store one merit function value for each configuration of the configurations 1220. The merit function values 1240 may function as scores by which the performance of the configurations 1220 are evaluated. Thus, the merit function values 1240 for two of the configurations 1220 may be compared with each other to determine which of the configurations 1220 is superior.

Notably, the merit function values 1240 may each be determined based on only one quality of the operation of the camera 800, such as focal length, chief ray angle, minimum center glass thickness of the main lens or a main lens component, maximum center glass thickness of the main lens or a main lens component, chromatic aberration minimization, and/or the like. Alternatively, the merit function values 1240 may each be a composite of multiple qualities of the operation of the camera 800, such as (but not limited to) any of those listed above.

The test field points 1250 may include definitions of one or more locations on the sensor of the camera 800 that are to be tested. The test field points 1250 may, for example, be Cartesian coordinates for specific sensor pixels to be simulated during application of the merit functions 1230.

Similarly, the test reconstruction plane locations 1260 may include definitions of one or more reconstruction plane locations of the camera 800 that are to be tested. The test reconstruction plane locations 1260 may be stored and tested relative to the location of the microlens array of the camera 800. More specifically, the test reconstruction plane locations 1260 may, for example, be stored and utilized in multiples of lambda as in the present disclosure.

The ray correction functions 1270 may be include one or more algorithms used to map between coordinates of real and ideal lens systems. One exemplary ray correction function is set forth above in the discussion of FIG. 6.

The simulated captured light-fields 1280 may include simulations of light-field data captured by the camera 800 in each configuration of the configurations 1220. The simulated captured light-fields 1280 may include a simulated captured light-field for each configuration of the configurations 1220, or alternatively, only for the configurations 1220 that are currently being evaluated and/or compared.

The combination weights 1290 may include weights applied to combinations of field points and reconstruction plane locations. Each of the combination weights 1290 may apply to a combination that consists of only one specific field point and one specific reconstruction plane location. Alternatively, each of the combination weights 1290 may apply to a combination that includes a range of field points and/or a range of reconstruction plane locations. The combination weights 1290 may be used in subsequent light-field data processing to enable higher-quality portions of the light-field data to be weighted more heavily in the production of the ultimate light-field image than lower-quality portions. This will be further described subsequently.

Figure 13:
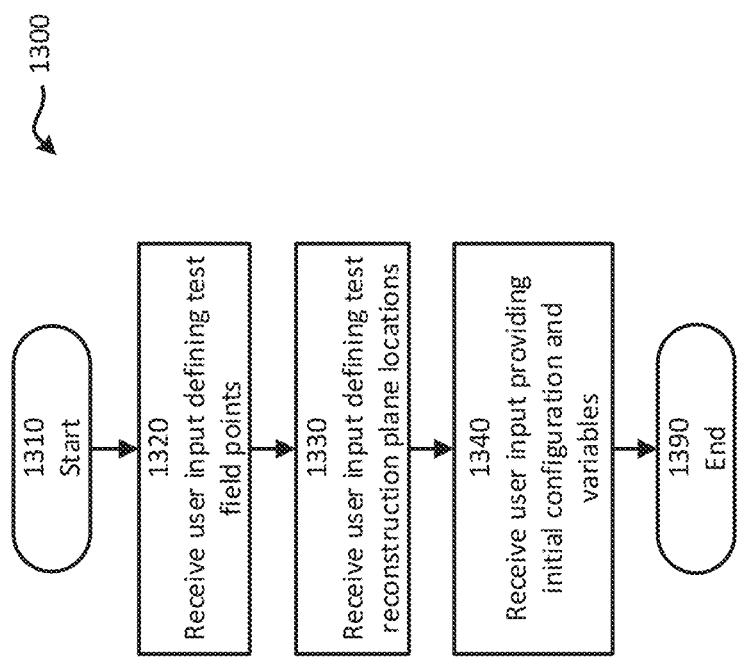
FIG. 13 is a flow diagram depicting a method of carrying out a setup procedure for a light-field camera design algorithm, according to one embodiment.
Figure 14:
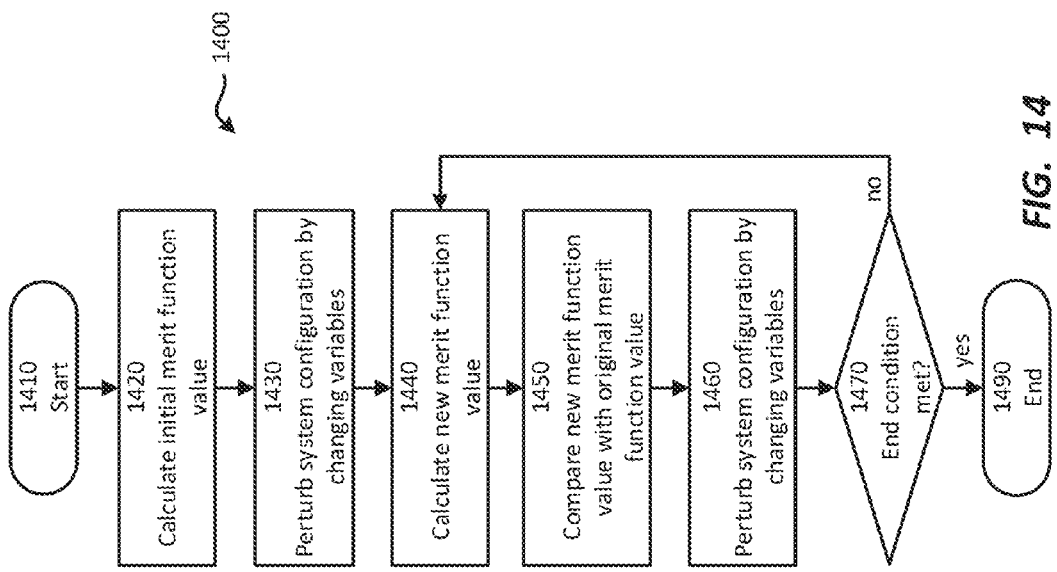
FIG. 14 is a flow diagram depicting a method of carrying out a light-field camera design algorithm to optimize the design of camera components, according to one embodiment.
Figure 15:
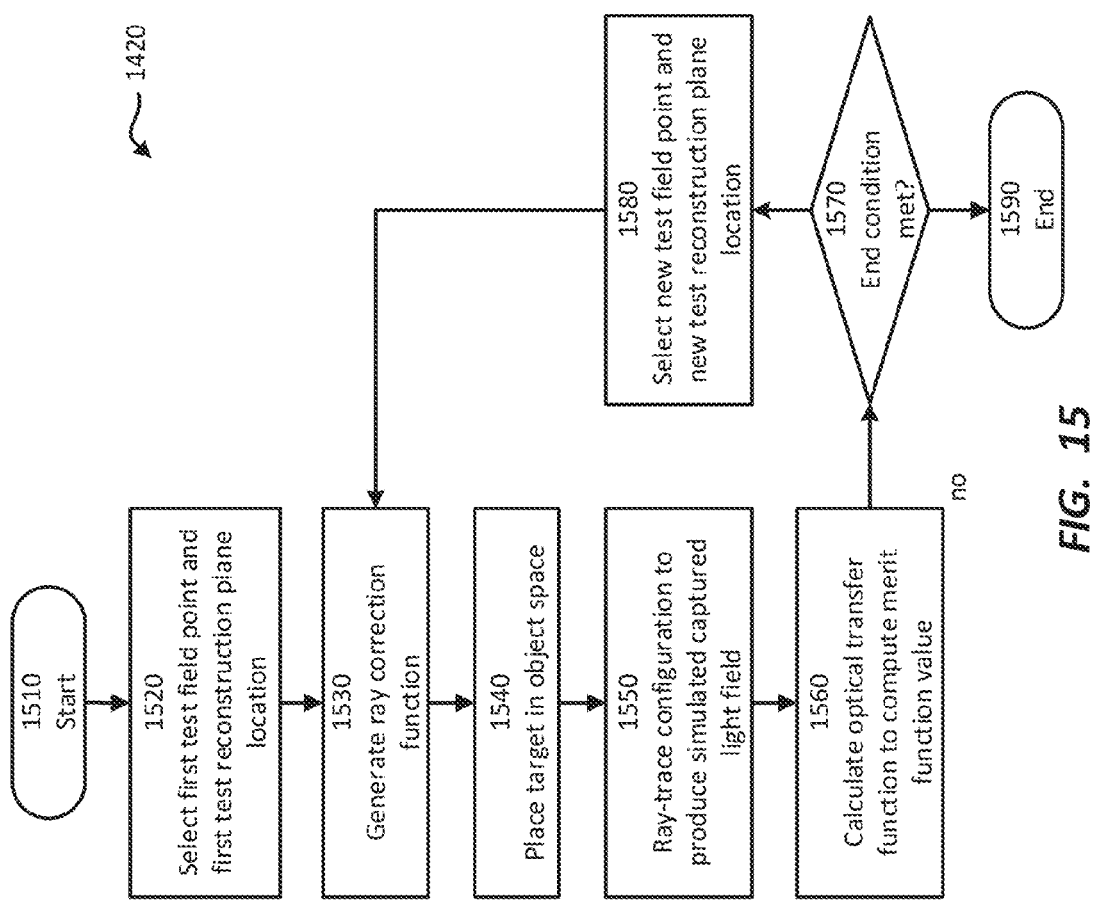
FIG. 15 is a flow diagram depicting a method of carrying out merit function calculation as in FIG. 14, according to one embodiment.

FIGS. 13, 14, and 15 illustrate methods for enhancing and/or optimizing the design of a light-field camera according to various embodiments. These will be shown and described subsequently.

Setup

FIG. 13 is a flow diagram depicting a method 1300 of carrying out a setup procedure for a light-field camera design algorithm, according to one embodiment. The method 1300 may be performed, for example, in a computing device such as the device 501 of FIG. 5, and may be used to prepare to design a light-field image capture device such as the camera 800 of FIGS. 2 and 3. The method 1300 may start 1310 and proceed as follows:

1. In a step 1320, the user defines the field points, or location on the sensor, to be tested. These may be the test field points 1250 of FIG. 12.
2. In a step 1330, the user defines (one or more) lambda values to be tested. These may be the test reconstruction plane locations 1260 of FIG. 12, which may be expressed as multiples of lambda as outlined previously.
3. In a step 1340, the user provides an initial lens design form and sets the desired parameters as variables (radii, thicknesses, index of refraction, and the like). This step may entail providing the attributes 1210 and the configurations 1220 of FIG. 12. The method 1300 may then end 1390.

Optimization

FIG. 14 is a flow diagram depicting a method 1400 of carrying out a light-field camera design algorithm to optimize the design of camera components, such as the main lens and/or an optional phase mask, according to one embodiment. The method 1400 may be performed, for example, in a computing device such as the device 501 of FIG. 5, and may be used to design a light-field image capture device such as the camera 800 of FIGS. 2 and 3. The method 1400 may start 1410 and proceed as follows:

1. In a step 1420, an initial merit value is calculated from a defined light-field merit function. This may entail application of a merit function 1230 of FIG. 12 based on the initial configuration selected in the step 1340 to obtain a merit function value 1240, as also shown in FIG. 12.
2. In a step 1430, the system is perturbed by changing one of the set variables. This may entail changing one of the variables 1222 to produce a new configuration 1220 of the camera 800.
3. In a step 1440, a new merit function value is calculated. This may entail application of a merit function 1230 of FIG. 12 (for example, the same merit function used in the step 1420) based on the configuration produced in the step 1430 to obtain a new merit function value 1240.
4. In a step 1450, the new merit function value 1240 may be compared with the initial merit function value 1240.
5. In a step 1460, based on whether merit function value improved or degraded, the system generates a new perturbed system. This may entail, again, changing one of the variables 1222 to produce a new configuration 1220 of the camera 800.
6. In a query 1470, a determination may be made as to whether an end condition has been met. Multiple end conditions may simultaneously be applied, and may include, but need not be limited to, termination of the method 1400 by a user, arrival at equilibrium by the method 1400 to indicate successful optimization of the design of the camera 800, the performance of a certain number of iterations, continuance of the method 1400 for a predetermined period of time, or the like. If an end condition has been met the method 1400 may end 1490. If not, the method 1400 may return to the step 1440 and continue iterating through the step 1440, the step 1450, the step 1460, and the query 1470 until an end condition has been met.

The method 1400 may be deemed to have reached equilibrium when perturbing the system away from a configuration results in less favorable performance (as determined via calculation of an inferior merit function value 1240) when compared with the configuration. The configuration may then be deemed to be an optimal configuration for the camera 800. In at least one embodiment, to prevent trapping at a local optimal solution, the system can perform many different perturbations and track the optimization along many paths in parallel. Once this has been done, the optimal choice may be selected from among the various optimal configurations obtained, for example, by comparing their merit function values 1240 and selecting the optimal configuration with the most favorable merit function value 1240.

Light-Field Merit Function Calculation

FIG. 15 is a flow diagram depicting a method of carrying out merit function calculation, which may be done to carry out the step 1420 and/or the step 1440 of FIG. 14, according to one embodiment. The step 1420 may be performed, for example, in a computing device such as the device 501 of FIG. 5. The step 1420 may start 1510 and proceed as follows:

1. In a step 1520, a first field point and lambda value are selected. This may entail selecting one test field point 1250 and one test reconstruction plane location 1260 of those selected in the step 1320 and the step 1330.
2. In a step 1530, the configuration is passed to a simulator, which generates a ray correction function as shown in FIG. 6.

3. In a step 1540, a target is placed in object space and scaled so that its image corresponds to the conjugate field and lambda (reconstruction plane location) in image space.
4. In a step 1550, the configuration is ray-traced to produce a simulated captured light-field; this is refocused to a corresponding lambda value (i.e., a corresponding reconstruction plane location).
5. In a step 1560, an optical transfer function is calculated; desired values are computed and returned to the lens design software. These desired values may ultimately be used to obtain the associated merit function value(s) 1240.
6. In a query 1570, a determination may be made as to whether an end condition has been met. Multiple end conditions may simultaneously be applied, and may include, but need not be limited exhaustion of all combinations of the test field points 1250 and the test reconstruction plane locations 1260, user termination of the merit function calculation process, or the like. If an end condition has been met, the step 1420 may end 1590. If an end condition has not been met, the step 1420 may proceed to a step 1580.
7. In the step 1580, a new combination of a test field point and a test reconstruction plane location may be selected. This may be done as in the step 1520. The step 1420 may return to the step 1530 and continue iterating through the step 1530, the step 1540, the step 1550, the step 1560, the query 1570, and the step 1580 until an end condition has been met.

The result of the method 1300 of FIG. 13 and the method 1400 of FIG. 14, including performance of the step 1420 as in FIG. 15, may be one or more optimal configurations of the camera 800. In such an optimal configuration, the variables 1222 selected by the user 500 may be at levels that result in the best-obtainable merit function value 1240. The light-field aware merit function can be combined with traditional lens design merit functions as well. There are hundreds of 2D variables to optimize against, but common examples include merit functions for focal length, chief ray angle, minimum and maximum center glass thicknesses, chromatic aberration minimization, and the like.

Spherically Aberrated Light-Field Lens

Some particular aberrations are well suited for light-field camera lenses. Spherical aberration in particular is a useful aberration as its magnitude depends solely on the exit pupil location of the ray.

Figure 16:
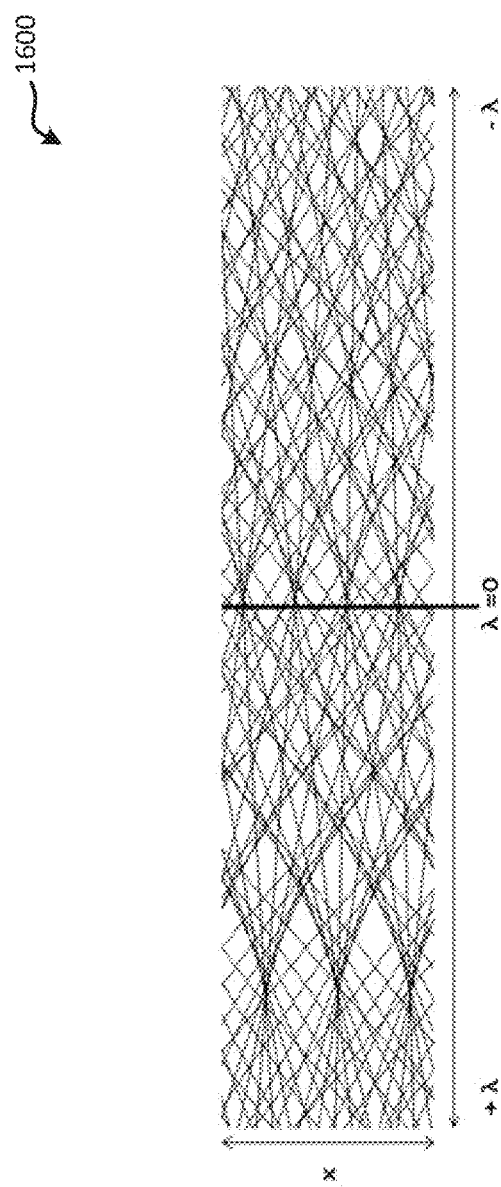
FIG. 16 is a diagram illustrating a projection pattern cross-section as in FIG. 8, but with a lens that has spherical aberration.

FIG. 16 depicts a projection pattern cross-section 1600 as in FIG. 8, but with a lens that has spherical aberration. The modification of the sample coordinates may result in a quasi-random sample distribution through the range of lambda, as shown. If a lens has only spherical aberration, this sample pattern would be uniform across the full field of view of the lens. This cannot be said for aberrations such as coma or astigmatism because their magnitude is dependent on the field's radial distance from the optical axis of the lens.

Figure 17:
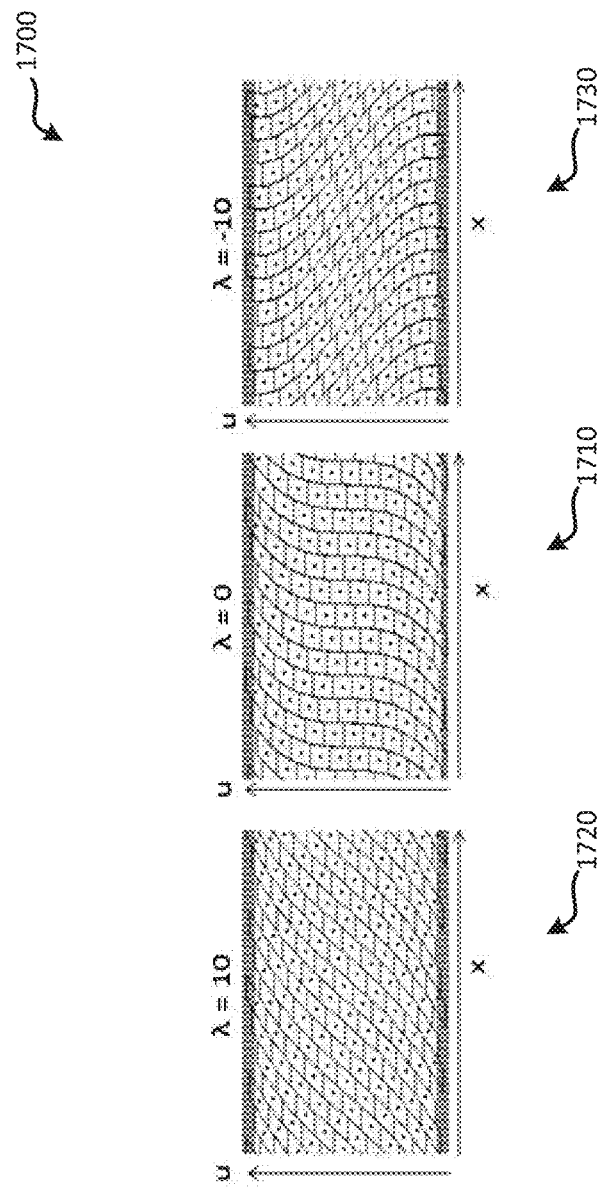
FIG. 17 is a ray space diagram for a lens with a spherical aberration.

FIG. 17 depicts a ray space diagram 1700 for a lens with a spherical aberration. The ray space diagram shows other interesting properties of spherical aberration in light-field cameras. At $\lambda=0$, as shown in the center diagram 1710, each pixel is not longer an equally sized rectangle in the ray space. Instead the diagram is deformed in 'S' type shape. As a result, the pixels in the center on the diagram are "sharp" and the pixels at the top and bottom are "blurry" as indicated by the width of each pixel's boundary area. At $\lambda=-10$, as shown in the left-hand diagram 1720, the diagram has been sheared counterclockwise. Here the blurry and sharp pixels have been reversed, so that the top and bottom pixels are sharp while the center pixels are blurrier. This has the effect of increasing the resolution of the light-field camera at negative lambda values as compared to an ideal lens. Inversely, all of the pixels at $\lambda=10$, as shown in the right-hand diagram 1730, have become blurrier and therefore the resolution at positive lambdas is lower than a system with an ideal lens. This loss of resolution at positive lambdas can be an acceptable tradeoff as positive lambdas correspond to real world object distances further away from the camera. A common camera configuration is to focus the camera so that an optical infinity is at a constant lambda value, such as $\lambda=7$. Therefore, the resolution of the system past $\lambda=7$ does not matter because no real object will ever focus to those planes.

Cubic Phase Mask for Light-Field Camera

An alternative to designing a lens specifically for light-field cameras is to instead use a phase mask in conjugation with an idea or near-ideal lens. A phase mask imparts a phase shift on the wavefront that varies as a function of pupil position. Therefore the mask can be placed at any pupil plane location, such as the exit pupil of the lens. An example phase mask is a cubic phase mask. This type of phase mask is commonly used in wavefront coding. The advantage of this system is that an off-the-shelf lens can be used without the need to know its optical prescription or characteristics.

Figure 18:
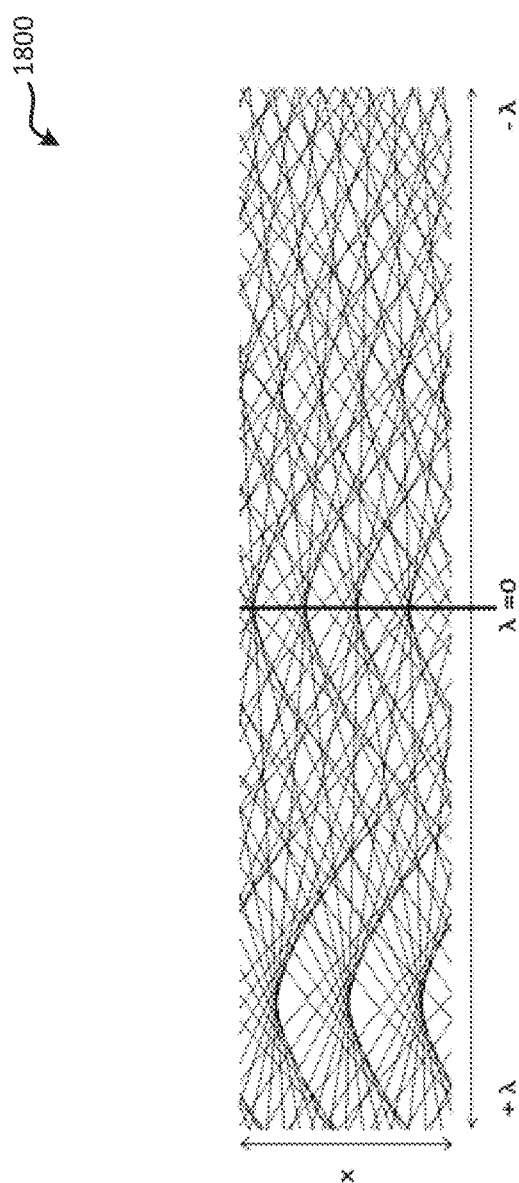
FIG. 18 is a diagram illustrating a projection pattern cross-section as in FIG. 8, but for an ideal lens modified with a cubic phase mask.

FIG. 18 shows a projection pattern cross-section 1800 as in FIG. 8, but for an ideal lens modified with a cubic phase mask. The modification of the sample coordinates results in a quasi-random and non-symmetric sample distribution through the range of lambda. Similar to the case of spherical aberration, the sample pattern will be uniform across the whole field of view. However, since the aberration is dependent on odd power (i.e., having an exponent that is an odd number), it is not radially symmetric like spherical aberration (since as a negative number to an odd power is negative, while a negative number to an even power is always positive).

Figure 19:
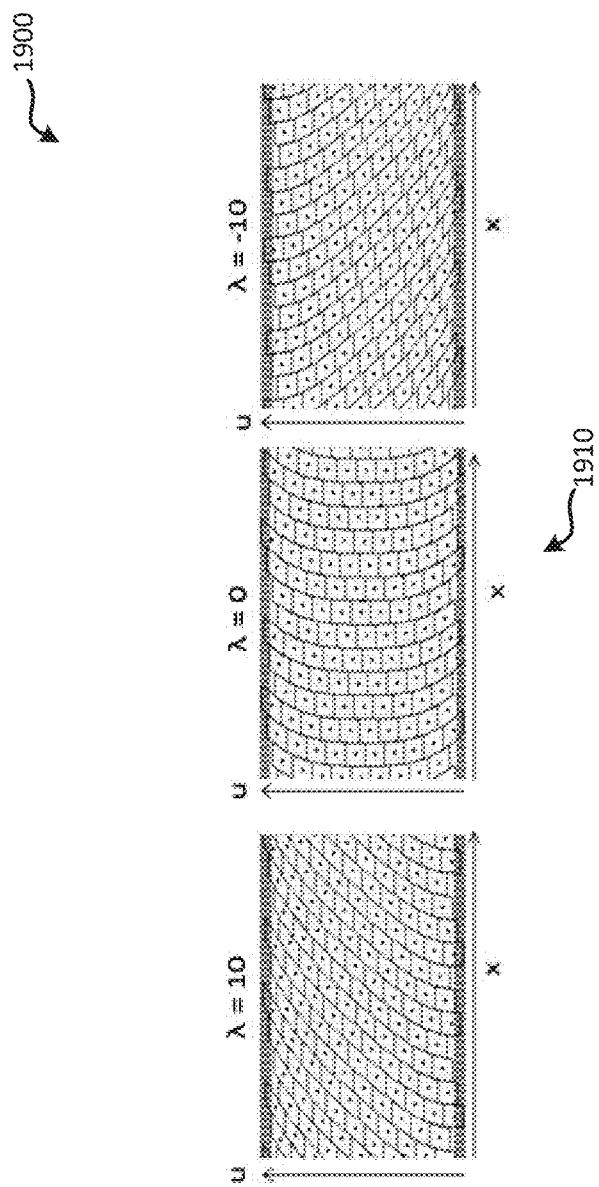
FIG. 19 is a ray space diagram for an ideal lens with a cubic phase mask at the exit pupil.

FIG. 19 depicts a ray space diagram 1900 for an ideal lens with a cubic phase mask at the exit pupil. Instead of the "S" shape of spherical aberration, the ray space diagram for the cubic phase mask has a "U" shape. At $\lambda=0$, as shown in the center diagram 1910, there is again a mixture of "blurry" and sharp pixels. The major difference as compared to the case of spherical aberration is that the "sharp" pixels are evenly balanced between the positive and negative lambda ranges. This has the effect of further extending the sharp refocusable range of the camera as compared to both an ideal lens and a spherically aberrated lens.

Arbitrary Aberrations and Optimization

Spherical aberration and a cubic phase mask are two simple examples of non-ideal lens system that have improved performance in a light-field camera. However, in at least one embodiment, the system optimizes across all of the free variables defined in the system and does not necessarily exhibit preferences for these particular examples. The resultant design, if the optimization is allowed to run long enough, is the minimum (or maximum) of the defined merit function.

Digital Aperturing

The three examples above show that samples with varying (x, y, u, v) coordinates have specific ranges of lambda for which they are sharpest. Another advantage of light-field photography is that during projection we can not only correct for aberrations, but also weight samples. This means that if a particular pixel is known to be defective, noisy, or blurry, its importance can be downweighted, or it can even be eliminated from the reconstruction. For instance, in the wavefront coding example, a reconstruction at $\lambda=0$ can downweight the samples at the top and bottom of the diagram. The resultant image would be sharper than a reconstructed image that used all of the samples equally. This is analogous to stopping down a lens in 2D photography. A photographer will commonly stop down a lens from the maximum aperture in order to increase the sharpness of the image. Similarly, when refocusing to λ=10 or λ=−10 samples on the top half or bottom half respectively can be down-weighted in order to increase the sharpness of the reconstruction.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for identifying an optimal set of variables for a light-field image capture device having a sensor, a main lens, and a plurality of microlenses, the method comprising:
    selecting a first configuration of the light-field image capture device, the first configuration comprising a first plurality of variables defining attributes of the light-field image capture device;
    in a processor, applying a merit function by simulating receipt of light through the main lens and the plurality of microlenses of the first configuration to calculate a first merit function value;
    in the processor, iteratively perturbing at least one of the first plurality of variables and applying the merit function to identify the optimal set of variables; and
    in an output device, providing output comprising the optimal set of variables.

2. The method of claim 1, further comprising, prior to selecting the first configuration:
    defining one or more test field points, wherein each test field point comprises a location on the sensor of the light-field image capture device; and
    defining one or more test reconstruction plane locations, wherein each test reconstruction plane location is defined relative to the plurality of microlenses;
    wherein applying the merit function comprises simulating receipt of light through the main lens and the plurality of microlenses at the test field points and the test reconstruction plane locations.

3. The method of claim 2, wherein applying the merit function comprises:
    selecting a first test field point of the test field points;
    selecting a first test reconstruction plane location of the test reconstruction plane locations;
    simulating receipt of light at the first test field point and the first test reconstruction plane location to generate a first ray correction function;
    positioning a target in object space;
    using the first ray correction function to ray-trace the first configuration to produce a first simulated captured light-field refocused to the first test reconstruction plane location; and
    calculating the first merit function value based on the first simulated captured light-field.

4. The method of claim 3, wherein applying the merit function further comprises:
    performing a plurality of iterations, wherein each iteration comprises:
        selecting a new test field point of the test field points;
        selecting a new test reconstruction plane location of the test reconstruction plane locations;
        simulating receipt of light at the new test field point and the new test reconstruction plane location to generate a new ray correction function;
        positioning a target in object space; and
        using the new ray correction function to ray-trace the first configuration to produce a new simulated captured light-field refocused to the first test reconstruction plane location;
    wherein calculating the first merit function value comprises calculating the first merit function value based on the new simulated captured light-fields produced in the iterations.

5. The method of claim 2, wherein the first merit function value is based on a two-dimensional merit function that measures an attribute selected from the group consisting of:
    focal length;
    chief ray angle;
    minimum center glass thickness;
    maximum center glass thickness; and
    chromatic aberration minimization.

6. The method of claim 2, further comprising:
    identifying one or more low-resolution combinations of test field points and test reconstruction plane locations that provide lower resolution relative to other combinations of test field points and test reconstruction plane locations;
    establishing other weights for the other combinations; and
    establishing low-resolution weights for the low-resolution combinations such that light-field data obtained from the low-resolution combinations have less influence than light-field data obtained from the other combinations in generation of a light-field image by the light-field image capture device.

7. The method of claim 1, wherein the attributes comprise a main lens attribute of a main lens of the image capture device, wherein the main lens attribute is selected from the group consisting of:
    a thickness of the main lens;
    a radius of the main lens;
    an index of refraction of the main lens; and
    an Abbe number of the main lens.

8. The method of claim 1, wherein the attributes comprise a main lens attribute of a main lens of the image capture device, wherein the main lens comprises an aberration from an ideal main lens design;

wherein, compared with the ideal main lens design, the aberration provides greater consistency of resolution of light-field data captured by the light-field image capture device.

9. The method of claim 8, wherein the main lens is configured such that a root-mean-square spot size of the lens is between one and three times a diameter of a microlens of the plurality of microlenses.

10. The method of claim 8, wherein the aberration comprises a substantially spherical aberration.

11. The method of claim 1, wherein the attributes comprise a phase mask attribute of a phase mask of the image capture device, wherein the main lens has a substantially ideal main lens design;
wherein the phase mask imparts a phase shift on a wavefront of light passing through the main lens such that the phase shift varies as a function of pupil position;
and wherein, compared with the ideal main lens design, the phase mask cooperates with the main lens to provide greater consistency of resolution of light-field data captured by the light-field image capture device.

12. The method of claim 11, wherein the phase mask comprises a cubic phase mask.

13. The method of claim 1, wherein iteratively perturbing at least one of the first plurality of variables and applying the merit function comprises performing a plurality of iterations until the optimal set of variables is identified, wherein each iteration comprises:
perturbing at least one of the plurality of variables to define a second configuration of the light-field image capture device different from the first configuration of the light-field capture device, the second configuration comprising a second plurality of variables defining the attributes;
applying the merit function by simulating receipt of light through the main lens and the plurality of microlenses of the second configuration to calculate a second merit function value;
comparing the second merit function value with the first merit function value to obtain comparison results;
based on the comparison results, determining whether the second plurality of variables is an optimal set of variables; and
if the second plurality of variables is not the optimal set of variables, setting the first plurality of variables equal to the second plurality of variables.

14. A computer program product for identifying an optimal set of variables for a light-field image capture device having a sensor, a main lens, and a plurality of microlenses, the computer program product comprising:
a non-transitory storage medium; and
computer program code, encoded on the medium, configured to cause at least one processor to perform the steps of:
receiving selection of a first configuration of the light-field image capture device, the first configuration comprising a first plurality of variables defining attributes of the light-field image capture device;
applying a merit function by simulating receipt of light through the main lens and the plurality of microlenses of the first configuration to calculate a first merit function value;
iteratively perturbing at least one of the first plurality of variables and applying the merit function to identify the optimal set of variables; and
causing an output device to provide output comprising the optimal set of variables.

15. The computer program product of claim 14, wherein the computer program code is further configured to cause the at last one processor, prior to receiving selection of the first configuration, to perform the steps of:
defining one or more test field points, wherein each test field point comprises a location on the sensor of the light-field image capture device; and
defining one or more test reconstruction plane locations, wherein each test reconstruction plane location is defined relative to the plurality of microlenses;
wherein applying the merit function comprises simulating receipt of light through the main lens and the plurality of microlenses at the test field points and the test reconstruction plane locations.

16. The computer program product of claim 15, wherein the computer program code configured to cause the at least one processor to apply the merit function comprises computer program code configured to cause the at least one processor to perform the steps of:
selecting a first test field point of the test field points;
selecting a first test reconstruction plane location of the test reconstruction plane locations;
simulating receipt of light at the first test field point and the first test reconstruction plane location to generate a first ray correction function;
positioning a target in object space;
using the first ray correction function to ray-trace the first configuration to produce a first simulated captured light-field refocused to the first test reconstruction plane location; and
calculating the first merit function value based on the first simulated captured light-field.

17. The computer program product of claim 16, wherein the computer program code configured to cause the at least one processor to apply the merit function comprises computer program code configured to cause the at least one processor to perform the steps of:
performing a plurality of iterations, wherein each iteration comprises:
selecting a new test field point of the test field points;
selecting a new test reconstruction plane location of the test reconstruction plane locations;
simulating receipt of light at the new test field point and the new test reconstruction plane location to generate a new ray correction function;
positioning a target in object space; and
using the new ray correction function to ray-trace the first configuration to produce a new simulated captured light-field refocused to the first test reconstruction plane location;
wherein the computer program code configured to cause the at least one processor to calculate the first merit function value comprises computer program code configured to cause the at least one processor to calculate the first merit function value based on the new simulated captured light-fields produced in the iterations.

18. The computer program product of claim 14, wherein the attributes comprise a main lens attribute of a main lens of the image capture device, wherein the main lens attribute is selected from the group consisting of:
a thickness of the main lens;
a radius of the main lens;
an index of refraction of the main lens; and
an Abbe number of the main lens.

19. The computer program product of claim 14, wherein the attributes comprise a main lens attribute of a main lens of the image capture device, wherein the main lens comprises an aberration from an ideal main lens design;

wherein, compared with the ideal main lens design, the aberration provides greater consistency of resolution of light-field data captured by the light-field image capture device.

20. The computer program product of claim 19, wherein the aberration comprises a substantially spherical aberration.

21. The computer program product of claim 14, wherein the attributes comprise a phase mask attribute of a phase mask of the image capture device, wherein the main lens has a substantially ideal main lens design;

wherein the phase mask imparts a phase shift on a wavefront of light passing through the main lens such that the phase shift varies as a function of pupil position;

wherein, compared with the ideal main lens design, the phase mask cooperates with the main lens to provide greater consistency of resolution of light-field data captured by the light-field image capture device;

and wherein the phase mask comprises a cubic phase mask.

22. The computer program product of claim 14, wherein the computer program code configured to cause the at least one processor to iteratively perturb the at least one of the first plurality of variables and apply the merit function comprises computer program code configured to cause the at least one processor to perform a plurality of iterations until the optimal set of variables is identified, wherein the computer program code configured to cause the at least one processor to perform the plurality of iterations comprises computer program code configured to cause the processor, in each iteration, to perform the steps of:

perturbing at least one of the first plurality of variables to define a second configuration of the light-field image capture device different from the first configuration of the light-field capture device, the second configuration comprising a second plurality of variables defining the attributes;

applying the merit function by simulating receipt of light through the main lens and the plurality of microlenses of the second configuration to calculate a second merit function value;

comparing the second merit function value with the first merit function value to obtain comparison results;

based on the comparison results, determining whether the second plurality of variables is an optimal set of variables; and if the second plurality of variables is not the optimal set of variables, setting the first plurality of variables equal to the second plurality of variables.

23. A system for identifying an optimal set of variables for a light-field image capture device having a sensor, a main lens, and a plurality of microlenses, the system comprising:

a processor configured to:

select a first configuration of the light-field image capture device, the first configuration comprising a first plurality of variables defining attributes of the light-field image capture device;

apply a merit function by simulating receipt of light through the main lens and the plurality of microlenses of the first configuration to calculate a first merit function value; and iteratively perturb at least one of the first plurality of variables and apply the merit function to identify the optimal set of variables; and an output device, communicatively coupled to the processor, configured to:

provide output comprising the optimal set of variables.

24. The system of claim 23, wherein the processor is further configured to:

define one or more test field points, wherein each test field point comprises a location on the sensor of the light-field image capture device; and define one or more test reconstruction plane locations, wherein each test reconstruction plane location is defined relative to the plurality of microlenses;

wherein the processor is further configured to apply the merit function by simulating receipt of light through the main lens and the plurality of microlenses at the test field points and the test reconstruction plane locations.

25. The system of claim 24, wherein the processor is further configured to apply the merit function by:

selecting a first test field point of the test field points;

selecting a first test reconstruction plane location of the test reconstruction plane locations;

simulating receipt of light at the first test field point and the first test reconstruction plane location to generate a first ray correction function;

positioning a target in object space;

using the first ray correction function to ray-trace the first configuration to produce a first simulated captured light-field refocused to the first test reconstruction plane location; and calculating the first merit function value based on the first simulated captured light-field.

26. The system of claim 25, wherein the processor is further configured to apply the merit function by:

performing a plurality of iterations, wherein each iteration comprises:

selecting a new test field point of the test field points;

selecting a new test reconstruction plane location of the test reconstruction plane locations;

simulating receipt of light at the new test field point and the new test reconstruction plane location to generate a new ray correction function;

positioning a target in object space; and using the new ray correction function to ray-trace the first configuration to produce a new simulated captured light-field refocused to the first test reconstruction plane location;

wherein the processor is further configured to calculate the first merit function value by calculating the first merit function value based on the new simulated captured light-fields produced in the iterations.

27. The system of claim 23, wherein the attributes comprise a main lens attribute of a main lens of the image capture device, wherein the main lens attribute is selected from the group consisting of:

a thickness of the main lens;

a radius of the main lens;

an index of refraction of the main lens; and an Abbe number of the main lens.

28. The system of claim 23, wherein the attributes comprise a main lens attribute of a main lens of the image capture device, wherein the main lens comprises an aberration from an ideal main lens design;

wherein, compared with the ideal main lens design, the aberration provides greater consistency of resolution of light-field data captured by the light-field image capture device.

29. The system of claim 28, wherein the aberration comprises a substantially spherical aberration.

30. The system of claim 23, wherein the attributes comprise a phase mask attribute of a phase mask of the image capture device, wherein the main lens has a substantially ideal main lens design;

wherein the phase mask imparts a phase shift on a wavefront of light passing through the main lens such that the phase shift varies as a function of pupil position;

and wherein, compared with the ideal main lens design, the phase mask cooperates with the main lens to provide greater consistency of resolution of light-field data captured by the light-field image capture device;

and wherein the phase mask comprises a cubic phase mask.

31. The system of claim 23, wherein the processor is further configured to iteratively perturb the at least one of the first plurality of variables and apply the merit function by performing a plurality of iterations until the optimal set of variables is identified, wherein the processor is further configured, in each iteration, to:

perturb at least one of the first plurality of variables to define a second
configuration of the light-field image capture device different from the first configuration of the light-field capture device, the second configuration comprising a second plurality of variables defining the attributes;

apply the merit function by simulating receipt of light through the main lens and the plurality of microlenses of the second configuration to calculate a second merit function value;

compare the second merit function value with the first merit function value to obtain comparison results;

based on the comparison results, determine whether the second plurality of variables is an optimal set of variables; and if the second plurality of variables is not the optimal set of variables, set the first plurality of variables equal to the second plurality of variables.

* * * * *